(12) United States Patent
Yamaga et al.

(10) Patent No.: US 11,688,425 B2
(45) Date of Patent: Jun. 27, 2023

(54) MAGNETIC RECORDING MEDIUM

(71) Applicant: SONY GROUP CORPORATION, Tokyo (JP)

(72) Inventors: Minoru Yamaga, Tokyo (JP); Tooru Sato, Tokyo (JP); Kanako Hashimoto, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/046,375

(22) PCT Filed: Jun. 17, 2020

(86) PCT No.: PCT/JP2020/023743
§ 371 (c)(1),
(2) Date: Oct. 9, 2020

(87) PCT Pub. No.: WO2021/070417
PCT Pub. Date: Apr. 15, 2021

(65) Prior Publication Data
US 2022/0254374 A1 Aug. 11, 2022

(30) Foreign Application Priority Data
Oct. 10, 2019 (JP) .................................. 2019-186902

(51) Int. Cl.
*G11B 5/78* (2006.01)
*G11B 5/65* (2006.01)

(52) U.S. Cl.
CPC ................ *G11B 5/78* (2013.01); *G11B 5/653* (2013.01)

(58) Field of Classification Search
CPC .. G11B 5/78; G11B 5/653; G11B 5/68; G11B 5/70; G11B 5/7013; G11B 5/702;
(Continued)

(56) References Cited

U.S. PATENT DOCUMENTS 10,720,181 B1 7/2020 Yamaga et al.
2003/0215670 A1* 11/2003 Takahashi .............. G11B 5/739
(Continued)

FOREIGN PATENT DOCUMENTS

JP  2006065953 A  3/2006
JP  2006-099919    4/2006
(Continued)

*Primary Examiner* — Holly Rickman
(74) *Attorney, Agent, or Firm* — K&L Gates LLP

(57) ABSTRACT

It is an object to provide a magnetic recording medium that enables good reproduction even after long-term preservation and that has a small overall thickness.
The present technology provides a tape-shaped magnetic recording medium including a magnetic layer, a ground layer, a base layer, and a back layer, in which an average thickness tT of the magnetic recording medium is equal to or less than 5.3 μm, and, when the magnetic recording medium is subjected to dynamic viscoelasticity measurement at a frequency of 10 Hz and a temperature rise rate of 2° C./min, a difference between a maximum and a minimum of a viscosity term E" in a temperature range of 0° C. to 80° C. is equal to or less than 0.18 GPa. In addition, the present technology also provides a tape cartridge including the tape-shaped magnetic recording medium.

28 Claims, 9 Drawing Sheets

(58) Field of Classification Search
CPC .... G11B 5/7021; G11B 5/7022; G11B 5/7023
See application file for complete search history.

(56) References Cited

U.S. PATENT DOCUMENTS

| | | |
|---|---|---|
| 2006/0072235 A1 | 4/2006 | Kuse et al. |
| 2007/0009768 A1* | 1/2007 | Takeda ............... G11B 5/73929 427/127 |
| 2008/0026256 A1* | 1/2008 | Kato ...................... G11B 5/733 428/847.2 |
| 2013/0044386 A1 | 2/2013 | Sato |
| 2021/0082462 A1* | 3/2021 | Bradshaw ................. G11B 5/78 |
| 2022/0208221 A1* | 6/2022 | Yamaga .............. G11B 5/73911 |

FOREIGN PATENT DOCUMENTS

| | | |
|---|---|---|
| JP | 2006099919 A | 4/2006 |
| JP | 2007-048427 | 2/2007 |
| JP | 2007048427 A | 2/2007 |
| JP | 2007-294075 | 11/2007 |
| JP | 2007294075 A | 11/2007 |
| JP | 2013-041646 | 2/2013 |
| JP | 2013041646 A | 2/2013 |
| JP | 6590102 | 9/2019 |
| JP | 6590102 B1 | 10/2019 |
| WO | 2019/171665 | 9/2019 |
| WO | 2019171665 A1 | 9/2019 |

* cited by examiner

A

B

MAGNETIC RECORDING MEDIUM

TECHNICAL FIELD

The present technology relates to a magnetic recording medium.

BACKGROUND ART

For example, attendant on the development of IoT, big data, artificial intelligent and the like, the amount of data collected and stored has been increasing largely. As a medium for recording a huge amount of data, a magnetic recording medium is often used.

In regard of magnetic recording media, a variety of technologies have been proposed. For example, PTL 1 discloses a technology concerning a magnetic recording medium having a magnetic layer including at least a binder and a magnetic powder on at least one main surface of a nonmagnetic support. The magnetic recording medium is characterized in that the film thickness of the magnetic layer is equal to or less than 0.12 μm, the root mean square surface roughness (Rq) of the surface of the magnetic layer forming surface is equal to or less than 4.0 nm, and skewness (Sk) of surface profile of the magnetic layer forming surface is −1 to +1.

CITATION LIST

Patent Literature

[PTL 1]
JP 2006-65953A

SUMMARY

Technical Problem

A magnetic recording medium is accommodated, for example, in a magnetic recording cartridge. In order to further increase recording capacity per magnetic recording cartridge, it may be contemplated to make the magnetic recording medium (for example, a magnetic recording tape) accommodated in the magnetic recording cartridge thinner (smaller in overall thickness), thereby increasing the tape length per magnetic recording cartridge.

However, as the overall thickness of the magnetic recording medium becomes smaller, recording or reproduction may not be performed favorably after long-term preservation of the magnetic recording medium. In view of this, it is an object of the present technology to provide a magnetic recording medium with which reproduction or recording can be performed favorably even after long-term preservation, notwithstanding a small overall thickness of the magnetic recording medium.

Solution to Problem

The present technology provides a magnetic recording medium in a tape shape including a magnetic layer, a ground layer, a base layer, and a back layer,
in which an average thickness $t_T$ of the magnetic recording medium is equal to or less than 5.3 μm, and
when the magnetic recording medium is subjected to dynamic viscoelasticity measurement at a frequency of 10 Hz and a temperature rise rate of 2° C./min, a difference between a maximum and a minimum of a viscosity term E" in a temperature range of 0° C. to 80° C. is equal to or less than 0.18 GPa.

In the present technology, when the magnetic recording medium is subjected to the dynamic viscoelasticity measurement, a difference between a maximum and a minimum of the viscosity term E" in a temperature range of 40° C. to 80° C. may be equal to or less than 0.10 GPa.

In an embodiment of the present technology, when the magnetic recording medium is subjected to the dynamic viscoelasticity measurement, a temperature at which a maximum of the viscosity term E" of the magnetic recording medium in −10° C. to 140° C. can be measured is in a range of 0° C. to 80° C.

In the embodiment, when the magnetic recording medium is subjected to the dynamic viscoelasticity measurement,
the viscosity term E" of the magnetic recording medium can exhibit a tendency of variation in which
the viscosity term E" of the magnetic recording medium increases as a measurement temperature rises from 0° C.,
the viscosity term E" of the magnetic recording medium reaches a maximum when the measurement temperature is in a range of more than 0° C. and less than 80° C., and
the viscosity term E" of the magnetic recording medium decreases as the measurement temperature rises from a temperature at which the maximum is measured to 80° C.

In the embodiment, when the magnetic recording medium is subjected to the dynamic viscoelasticity measurement, a difference between a maximum and a minimum of the viscosity term E" in a temperature range of 0° C. to 80° C. can be 0.13 to 0.17 GPa.

In another embodiment of the present technology, when the magnetic recording medium is subjected to the dynamic viscoelasticity measurement, a temperature at which a minimum of the viscosity term E" of the magnetic recording medium in −10° C. to 140° C. may be measured is in a range of 0° C. to 80° C.

In the embodiment, when the magnetic recording medium is subjected to the dynamic viscoelasticity measurement,
the viscosity term E" of the magnetic recording medium can exhibit a tendency of variation in which
the viscosity term E" of the magnetic recording medium decreases as a measurement temperature rises from 0° C.,
the viscosity term E" of the magnetic recording medium reaches a minimum when the measurement temperature is in a range of more than 0° C. and less than 80° C., and
the viscosity term E" of the magnetic recording medium increases as the measurement temperature rises from a temperature at which the minimum is measured to 80° C.

In the embodiment, when the magnetic recording medium is subjected to the dynamic viscoelasticity measurement, a difference between a maximum and a minimum of the viscosity term E" in a temperature range of 0° C. to 80° C. can be equal to or less than 0.12 GPa.

In a further embodiment of the present technology, when the magnetic recording medium is subjected to the dynamic viscoelasticity measurement,
a difference between a maximum and a minimum of the viscosity term E" in a temperature range of 0° C. to 80° C. may be equal to or less than 0.12 GPa, and
a difference between a maximum and a minimum of the viscosity term E" in a temperature range of 40° C. to 80° C. may be equal to or less than 0.06 GPa.

When the magnetic recording medium is subjected to the dynamic viscoelasticity measurement, a difference between a maximum and a minimum of an elasticity term E' in a temperature range of 0° C. to 80° C. may be equal to or less than 1.5 GPa.

When the magnetic recording medium is subjected to the dynamic viscoelasticity measurement, a difference between a maximum and a minimum of an elasticity term E' in a temperature range of 0° C. to 80° C. may be equal to or less than 0.5 GPa.

The base layer may include any one of PET, PEN, or PEEK.

A thickness of the base layer can be equal to or less than 4.2 μm.

A thickness of the base layer can be equal to or less than 4.0 μm.

A length of the magnetic recording medium in a longitudinal direction can be equal to or more than 1,000 m.

A squareness ratio of the magnetic recording medium in a perpendicular direction can be equal to or less than 65%.

An average thickness $t_m$ of the magnetic layer can be equal to or less than 80 nm.

An average thickness $t_m$ of the magnetic layer can be equal to or less than 50 nm.

The magnetic layer can include a magnetic powder, and the magnetic powder can contain hexagonal ferrite, ε iron oxide, or Co-containing spinel ferrite.

The hexagonal ferrite can contain at least one of Ba or Sr, and the ε iron oxide can contain at least one of Al or Ga.

A coercive force Hc of the magnetic recording medium in a longitudinal direction can be equal to or less than 2,000 Oe.

The magnetic layer may be configured to be able to record data such that a minimum of a magnetization reversal interval L is equal to or less than 48 nm.

The magnetic layer can include a magnetic powder, and an average aspect ratio of the magnetic powder can be from 1.0 to 3.5.

The magnetic layer can include a magnetic powder, and an average particle size of the magnetic powder can be equal to or less than 50 nm.

The magnetic layer can include a magnetic powder, and an average particle volume of the magnetic powder can be equal to or less than 1,500 $nm^3$.

The magnetic layer can include a magnetic powder, and an average particle size of the magnetic powder can be equal to or less than 1,300 $nm^3$.

The average thickness $t_T$ of the magnetic recording medium can be equal to or less than 5.2 μm.

The present technology provides a tape cartridge including the above-described magnetic recording medium.

In addition, the present technology provides the above-described tape cartridge including:

a communication section that performs communication with a recording and reproduction apparatus;

a storage section; and a control section that stores information received from the recording and reproduction apparatus through the communication section into the storage section and, in response to a request from the recording and reproduction apparatus, reads out information from the storage section to transmit the information to the recording and reproduction apparatus through the communication section, in which the information includes adjustment information for adjusting a tension exerted on the magnetic recording medium in a longitudinal direction.

DESCRIPTION OF EMBODIMENTS

Figure 1:
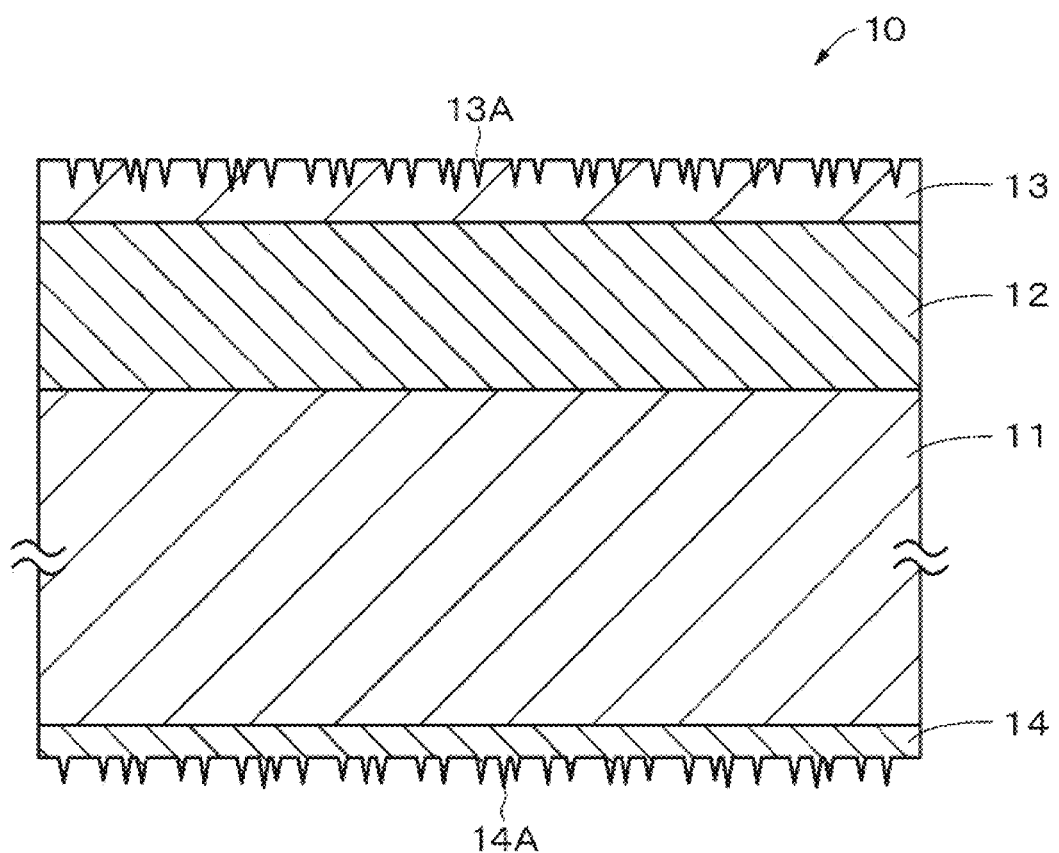
FIG. 1 is a schematic sectional view of an example of a magnetic recording medium according to the present technology.

Preferred modes for carrying out the present technology will be described below. Note that the embodiments described below are typical embodiments of the present technology, and the scope of the present technology is not limited only to these embodiments.

The present technology will be described in the following order.

1. Description of the present technology
2. Embodiments of the present technology (Example of coating-type magnetic recording medium)
  (1) Configuration of magnetic recording medium
  (2) Description of each layer
  (3) Physical properties and structures
  (4) Manufacturing method for magnetic recording medium
  (5) Recording and reproduction apparatus
  (6) Cartridge
  (7) Modification of cartridge
  (8) Effect
  (9) Modifications
3. Examples

1. DESCRIPTION OF THE PRESENT TECHNOLOGY

The present inventors have made investigations of various magnetic recording media having a small overall thickness. As a result of the investigations, the present inventors have found out that a magnetic recording medium having a specific configuration is capable of good reproduction or recording even after long-term preservation. Specifically, the present technology provides a tape-shaped magnetic recording medium including a magnetic layer, a ground layer, a base layer, and a back layer, in which the average thickness $t_T$ of the magnetic recording medium is equal to or less than 5.3 μm, and, when the magnetic recording medium is subjected to dynamic viscoelasticity measurement, the difference between a maximum and a minimum of a viscosity term E" in a temperature range of 0° C. to 80° C. is equal to or less than 0.18 GPa.

When a magnetic recording medium is reproduced after it is preserved for a long time, it may be impossible to read servo signals on the magnetic recording medium, and as a result, reproduction may require a longer time than in a normal case or reproduction may be impossible. Such a phenomenon is more liable to occur as the overall thickness of the magnetic recording medium is smaller. One of the causes for the occurrence of such a phenomenon as the overall thickness is reduced is considered that deformation (particularly, deformation in the width direction) of the magnetic recording medium is more liable to occur as the overall thickness of the magnetic recording medium is reduced.

As a result of the present inventors' investigation of the above-mentioned phenomenon, it has been found that deformation of the magnetic recording medium may occur, for example, when strains generated in the magnetic recording medium are canceled, particularly, that a problem concerning strains is liable to appear in the case where the overall thickness of the magnetic recording medium is reduced more. The strains are liable to occur particularly in the case where heat is applied to the magnetic recording medium, and strains due to heat are more liable to occur when the overall thickness of the magnetic recording medium is further reduced. Examples of the case where heat is applied to the magnetic recording medium include the case where a magnetic recording cartridge is transported. For example, during transportation by ship, the magnetic recording cartridge may be subjected to a comparatively high temperature (for example, on the order of 50° C.). In addition, in a manufacturing process of the magnetic recording medium, the magnetic recording medium may be subjected to a temperature range of 0° C. to 80° C. for a long time. Strains possibly generated in this temperature range are also considered to influence the deformation of the magnetic recording medium. Strains generated during when the magnetic recording medium is subjected to particularly a temperature range of 40° C. to 80° C., of the above-mentioned temperature range, are considered to particularly influence the deformation of the magnetic recording medium. Further, strains may be generated also in the manufacturing process of the magnetic recording medium (particularly, steps in which the magnetic recording medium is subjected to a high temperature, such as a calendering step and a drying step, and a curing step in which the magnetic recording medium is subjected to a high temperature for a long time).

The present inventors have found out that a magnetic recording medium according to the present technology which has the above-mentioned configuration is able to perform good reproduction or recording even after long-term preservation, notwithstanding its overall thickness is small. This is considered to be because the above-mentioned configuration can restrain strains from being generated in the magnetic recording medium.

In the magnetic recording medium according to the present technology, when the magnetic recording medium is subjected to dynamic viscoelasticity measurement, the difference between a maximum and a minimum of a viscosity term E" in a temperature range of 0° C. to 80° C. is equal to or less than 0.18 GPa, preferably equal to or less than 0.17 GPa. With the difference in this numerical value range, reproduction or recording with the magnetic recording medium having a small overall thickness can be performed favorably even after long-term preservation.

In addition, this difference may be, for example, equal to or more than 0, and a value of closer to 0 is better. Note that taking into account that a polymer of an organic polymer can be used as a material for the base layer, the difference may be, for example, equal to or more than 0.01 GPa, and further, may be equal to or more than 0.03 GPa.

Particularly preferably, when the magnetic recording medium is subjected to the dynamic viscoelasticity measurement, the difference between a maximum and a minimum of a viscosity term E" in a temperature range of 40° C. to 80° C. is equal to or less than 0.10 GPa. That the difference is in this numerical value range also contributes to good performing of reproduction or recording with the magnetic recording medium having a small overall thickness even after long-term preservation.

The method for the dynamic viscoelasticity measurement will be described in 2 below.

The average thickness $t_T$ of the magnetic recording medium according to the present technology can be equal to or less than 5.4 µm, preferably equal to or less than 5.3 µm, and more preferably equal to or less than 5.2 µm, equal to or less than 5.0 µm, or equal to or less than 4.6 µm. Since the magnetic recording medium according to the present technology is such a thin one, it is possible, for example, to enlarge the tape length taken up into one magnetic recording cartridge, and thereby to enhance the recording capacity per magnetic recording cartridge.

The width of the magnetic recording medium according to the present technology can be, for example, 5 to 30 mm, particularly 7 to 25 mm, more particularly 10 to 20 mm, and further particularly 11 to 19 mm. The length of the magnetic recording medium according to the present technology may be, for example, 500 to 1,500 m, for example, equal to or more than 1,000 m. For example, the tape width according to the LTO 8 standard is 12.65 mm, and the length is 960 m.

The magnetic recording medium according to the present technology is tape-shaped, and may be, for example, an elongate magnetic recording tape. The tape-shaped magnetic recording medium according to the present technology may be accommodated in, for example, a magnetic recording cartridge. More specifically, the tape-shaped magnetic recording medium may be accommodated in the magnetic recording cartridge in the state of being wound around a reel in the cartridge.

The magnetic recording medium according to the present technology includes a magnetic layer, a ground layer, a base layer, and a back layer. These four layers may be stacked in this order. The magnetic recording medium according to the present technology may include other layers in addition to these layers. The other layers may be selected, as required, according to the kind of the magnetic recording medium. The magnetic recording medium according to the present technology may be, for example, a coating-type magnetic recording medium. The coating-type magnetic recording medium will be described in more detail in 2 below.

In a preferred embodiment of the present technology, when the magnetic recording medium is subjected to the dynamic viscoelasticity measurement, the temperature at which a maximum of the viscosity term E" of the magnetic recording medium in a temperature range of −10° C. to 140° C. is measured may be in the range of, for example, 0° C. to 80° C., particularly in the range of 20° C. to 80° C., more particularly in the range of 40° C. to 80° C., and further particularly in the range of 45° C. to 75° C.

In this embodiment, when the magnetic recording medium is subjected to the dynamic viscoelasticity measurement, the viscosity term E" of the magnetic recording medium can exhibit a tendency of variation in which the viscosity term E" of the magnetic recording medium increases as the measurement temperature rises from 0° C., the viscosity term E" of the magnetic recording medium reaches a maximum when the measurement temperature is in the range of more than 0° C. and less than 80° C., particularly 10° C. to less than 80° C., more particularly 20° C. to less than 80° C., further particularly 40° C. to less than 80° C., and still further particularly 40° C. to 75° C., and the viscosity term E" of the magnetic recording medium decreases as the measurement temperature rises from the temperature at which the maximum is measured to 80° C.

In other words, the graph of the viscosity term E" plotted against temperature may have an upwardly protuberant shape. That the magnetic recording medium has a physical property such as to exhibit such a variation of the viscosity term E" in the dynamic viscoelasticity characteristics contributes to the capability of performing good reproduction or recording even after long-term preservation.

In this embodiment, when the magnetic recording medium is subjected to the dynamic viscoelasticity measurement, the difference between a maximum and a minimum of the viscosity term E" in a temperature range of 0° C. to 80° C. is preferably 0.13 to 0.18 GPa, and more preferably 0.13 to 0.17 GPa.

For the magnetic recording medium to have the above-mentioned characteristics concerning the viscosity term E", for example, PEN can be used as the material for forming the base layer.

In another preferred embodiment of the present technology, when the magnetic recording medium is subjected to the dynamic viscoelasticity measurement, the temperature at which the minimum of the viscosity term E" of the magnetic recording medium in a temperature range of −10° C. to 140° C. is measured may be in the range of, for example, 0° C. to 80° C., may be particularly in the range of 20° C. to 80° C., more particularly in the range of 40° C. to 80° C., and may be further particularly in the range of 40° C. to 75° C.

In this embodiment, when the magnetic recording medium is subjected to the dynamic viscoelasticity measurement, the viscosity term E" of the magnetic recording medium can exhibit a tendency of variation in which the viscosity term E" of the magnetic recording medium decreases as the measurement temperature rises from 0° C., the viscosity term E" of the magnetic recording medium reaches a minimum when the measurement temperature is in the range of more than 0° C. and less than 80° C., particularly in the range of 10° C. to less than 80° C., more particularly in the range of 20° C. to less than 80° C., further particularly in the range of 40° C. to less than 80° C., and still further particularly in the range of 40° C. to 75° C., and the viscosity term E" of the magnetic recording medium increases as the measurement temperature rises from the temperature at which the minimum is measured to 80° C.

In other words, the graph of the viscosity term E" plotted against temperature can have a downwardly recessed shape. That the magnetic recording medium has a physical property such as to exhibit such a variation of the viscosity term E" in the dynamic viscoelasticity characteristics contributes to the capability of performing good reproduction or recording even after long-term preservation.

In this embodiment, when the magnetic recording medium is subjected to the dynamic viscoelasticity measurement, the difference between a maximum and a minimum of the viscosity term E" in a temperature range of 0° C. to 80° C. is preferably equal to or less than 0.12 GPa, and more preferably equal to or less than 0.11 GPa.

In addition, in this embodiment, when the magnetic recording medium is subjected to the dynamic viscoelasticity measurement, the difference between a maximum and a minimum of an elasticity term E' in a temperature range of 0° C. to 80° C. may be equal to or less than 1.5 GPa.

For the magnetic recording medium to have the above-mentioned characteristics concerning the viscosity term E" and the elasticity term E', for example, PET can be used as the material for forming the base layer.

In a further preferred embodiment of the present technology, when the magnetic recording medium is subjected to the dynamic viscoelasticity measurement, the difference between a maximum and a minimum of the viscosity term E" in a temperature range of 0° C. to 80° C. is equal to or less than 0.12 GPa, and the difference between a maximum and a minimum of the viscosity term E" in a temperature range of 40° C. to 80° C. is equal to or less than 0.06 GPa. In other words, in the temperature range of 0° C. to 80° C., the value of the viscosity term E" does not vary largely, and the graph of the viscosity term E" plotted against temperature exhibits neither of an upwardly protuberant shape and a downwardly recessed shape. The magnetic recording medium in this embodiment is capable of performing good reproduction or recording even after long-term preservation.

In this embodiment, when the magnetic recording medium is subjected to the dynamic viscoelasticity measurement, the difference between a maximum and a minimum of the elasticity term E' in a temperature range of 0° C. to 80° C. may be equal to or less than 1.5 GPa, and preferably equal to or less than 0.5 GPa.

For the magnetic recording medium to have the above-mentioned characteristics concerning the viscosity term E" and the elasticity term E', for example, PEEK can be used as the material for forming the base layer.

2. EMBODIMENTS OF THE PRESENT TECHNOLOGY (EXAMPLE OF COATING-TYPE MAGNETIC RECORDING MEDIUM)

(1) Configuration of Magnetic Recording Medium

First, referring to FIG. 1, the configuration of a magnetic recording medium 10 according to a first embodiment will be described. The magnetic recording medium 10 is, for example, a magnetic recording medium having been subjected to a perpendicular orientation treatment, and, as depicted in FIG. 1, it includes an elongate base layer (also called substrate) 11, a ground layer (non-magnetic layer) 12 provided on one main surface of the base layer 11, a magnetic layer (also called recording layer) 13 provided on the ground layer 12, and a back layer 14 provided on the other main surface of the base layer 11. Herein, of both main surfaces of the magnetic recording medium 10, the surface on the side on which the magnetic layer 13 is provided is referred to also as a magnetic surface or a magnetic layer side surface, and the surface on the side opposite to the magnetic surface (the surface on the side on which the back layer 14 is provided) is referred to also as a back surface.

The magnetic recording medium 10 is tape-shaped and is made to travel in the longitudinal direction at the time of recording and reproduction. In addition, the magnetic recording medium 10 may be configured to be able to record signals with a shortest recording wavelength of preferably equal to or less than 100 nm, more preferably equal to or less than 75 nm, further preferably equal to or less than 60 nm, and particularly preferably equal to or less than 50 nm, and may be used on a recording and reproduction apparatus in which the shortest recording wavelength is in the above-mentioned range, for example. The recording and reproduction apparatus may have a ring-type head as a recording head.

(2) Description of Each Layer (Base Layer)

The base layer 11 is a layer capable of functioning as a support of the magnetic recording medium 10, is, for example, a flexible elongate nonmagnetic substrate, and can be particularly a nonmagnetic film. The thickness of the base layer 11 is, for example, equal to or less than 4.8 µm, preferably equal to or less than 4.6 µm, more preferably equal to or less than 4.4 µm, further preferably equal to or less than 4.2 µm, equal to or less than 4.0 µm, or equal to or less than 3.8 µm. The thickness of the base layer 11 can be, for example, equal to or more than 2.0 µm, preferably equal to or more than 2.2 µm, more preferably equal to or more than 2.4 µm, and further preferably equal to or more than 2.6 µm.

The average thickness of the base layer 11 is determined as follows. First, a magnetic recording medium 10 with a width of ½ inch is prepared and is cut to a length of 250 mm to produce a sample. Subsequently, other layers than the base layer 11 of the sample (namely, the ground layer 12, the magnetic layer 13, and the back layer 14) are removed by a solvent such as MEK (methyl ethyl ketone) or diluted hydrochloric acid. Next, using a laser holographic gauge (LGH-110C) produced by Mitutoyo Corporation as a measuring instrument, the thickness of the sample (base layer 11) is measured at five or more positions, and the measurements are simply averaged (arithmetic mean) to calculate the average thickness of the base layer 11. Note that the measurement positions are selected at random from the sample.

The base layer 11 includes, for example, a polyester as a main constituent. The polyester may be one or a mixture of two or more of, for example, PET (polyethylene terephthalate), PEN (polyethylene naphthalate), PBT (polybutylene terephthalate), PBN (polybutylene naphthalate), PCT (polycyclohexylene dimethylene terephthalate), PEB (polyethylene-p-oxybenzoate), and polyethylene bisphenoxycarboxylate. Herein, the "main constituent" means that the constituent in question is a constituent which is the highest in content of the constituents of the base layer. For example, the expression that the base layer 11 includes a polyester as the main constituent may mean that the content of the polyester in the base layer 11 is, for example, equal to or more than 50 mass %, equal to or more than 60 mass %, equal to or more than 70 mass %, equal to or more than 80 mass %, equal to or more than 90 mass %, equal to or more than 95 mass %, or equal to or more than 98 mass %, based on the mass of the base layer 11, or the base layer 11 only includes the polyester.

In this embodiment, the base layer 11 may contain other resins than the polyester which will be described below, in addition to the polyester.

According to a preferred embodiment of the present technology, the base layer 11 may include PET or PEN.

In another embodiment of the present technology, the base layer 11 may include other resin than the polyester. The resin forming the base layer 11 may include at least one of, for example, polyolefin resins, cellulose derivatives, vinyl resins, or other polymer resins. In the case where the base layer 11 includes two or more of these resins, the two or more materials may be mixed with one another, may be copolymerized with one another, or may be stacked on one another.

The polyolefin resin includes at least one of, for example, PE (polyethylene) or PP (polypropylene). The cellulose derivative includes at least one of, for example, cellulose diacetate, cellulose triacetate, CAB (cellulose acetate butyrate), or CAP (cellulose acetate propionate). The vinyl resin includes at least one of, for example, PVC (polyvinyl chloride) or PVDC (polyvinylidene chloride).

The other polymer resin includes at least one of, for example, PEEK (polyether ether ketone), PA (polyamide, nylon), aromatic PA (aromatic polyamide, aramid), PI (polyimide), aromatic PI (aromatic polyimide), PAI (polyamide imide), aromatic PAI (aromatic polyamide imide), PBO (polybenzoxazole, for example, Xyron®), polyether, PEK (polyether ketone), polyether ester, PES (polyether sulfone), PEI (polyether imide), PSF (polysulfone), PPS (polyphenylene sulfide), PC (polycarbonate), PAR (polyarylate), or PU (polyurethane).

According to a preferred embodiment of the present technology, the base layer 11 may include PEEK.

(Magnetic Layer)

The magnetic layer 13 can be, for example, a perpendicular recording layer. The magnetic layer 13 can include a magnetic powder and a lubricant. The magnetic layer 13 may include, for example, a binder in addition to the magnetic powder and the lubricant and, particularly, may further include a binder and conductive particles. The magnetic layer 13 may further include additives such as, for example, a polishing agent and a rust-preventive agent, as required.

The magnetic layer 13 has micropores. In other words, the magnetic layer 13 has a surface provided with a multiplicity of micropores. Preferably, of the magnetic layer 13, the region making contact with a magnetic head in recording and/or reproduction with the magnetic recording medium 10 is provided with the micropores, and, particularly preferably, the micropores may be provided throughout the region.

The micropores may be opening perpendicularly to the surface of the magnetic layer 13. The micropores can be formed, for example, by pressing a multiplicity of projected portions provided in the back layer side surface of the magnetic recording medium 10. In this case, the micropores can correspond to the projected portions.

Note that while the micropores are denoted by reference sign 13A in FIG. 1, FIG. 1 is a schematic diagram for good understanding of the present technology, and the shape of the micropores 13A depicted in FIG. 1 does not necessarily designate the actual shape.

The average thickness $t_m$ of the magnetic layer 13 can be preferably 35 nm≤$t_m$≤120 nm, more preferably 35 nm≤$t_m$≤100 nm, particularly preferably 35 nm≤$t_m$≤90 nm, further preferably 35 nm≤$t_m$≤80 nm, and especially preferably 35 nm≤$t_m$≤50 nm. That the average thickness $t_m$ of the magnetic layer 13 is in the above-mentioned numerical value range contributes to enhancement of electromagnetic conversion characteristics.

Particularly preferably, the average thickness $t_m$ of the magnetic layer may be equal to or less than 80 nm, and more preferably equal to or less than 50 nm. That the magnetic layer has an average thickness in this numerical value range contributes to enhancement of recording and reproduction characteristics of the magnetic recording medium 10.

The average thickness $t_m$ of the magnetic layer 13 is determined, for example, in the manner as follows.

Thinning of the magnetic recording medium 10 is conducted by processing by an FIB (Focused Ion Beam) method or the like. In the case of using the FIB method, as a pretreatment for observation of a TEM image of a section described later, a carbon film and a tungsten thin film are formed as protective films. The carbon film is formed on the magnetic layer side surface and the back layer side surface of the magnetic recording medium 10 by a vapor deposition method, and the tungsten thin film is further formed over the magnetic layer side surface by a vapor deposition method or a sputtering method. The thinning is conducted along the lengthwise direction (longitudinal direction) of the magnetic recording medium 10. In other words, a section parallel to both the longitudinal direction and the thickness direction of the magnetic recording medium 10 is formed by the thinning.

The section of the thus obtained thinned sample is observed by a TEM (Transmission Electron Microscope) under the following conditions, to obtain a TEM image. Note that the magnification and the acceleration voltage may be adjusted, as required, according to the kind of the apparatus.

Apparatus: TEM (H9000NAR, produced by Hitachi, Ltd.)
Acceleration voltage: 300 kV
Magnification: 100,000 times Next, by using the thus obtained TEM image, the thickness of the magnetic layer 13 is measured at ten or more positions in the longitudinal direction of the magnetic recording medium 10. The measurements thus obtained are simply averaged (arithmetic mean), and the mean thus obtained is made to be the average thickness $t_m$ [nm] of the magnetic layer 13. Note that the positions where the measurement is conducted are selected at random from the specimen.

The magnetic layer 13 is preferably a magnetic layer with perpendicular orientation. Herein the perpendicular orientation means that a squareness ratio S1 measured in the longitudinal direction (traveling direction) of the magnetic recording medium 10 is equal to or less than 35%. The method for measuring the squareness ratio S1 will be separately described below.

Note that the magnetic layer 13 may be a magnetic layer with in-plane orientation (longitudinal orientation). In other words, the magnetic recording medium 10 may be a horizontal recording type magnetic recording medium. However, perpendicular orientation is preferred from the viewpoint of high recording density.

(Servo Pattern)

Figure 2:
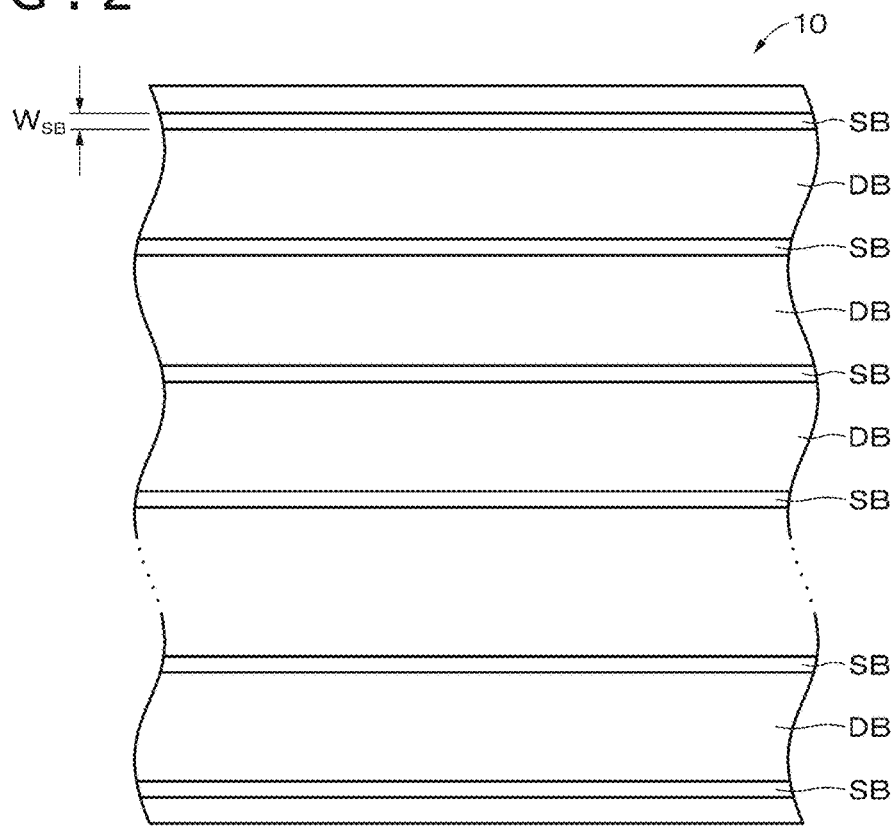
FIG. 2 is a diagram depicting an example of data bands and servo bands provided on the magnetic recording medium.
Figure 2:
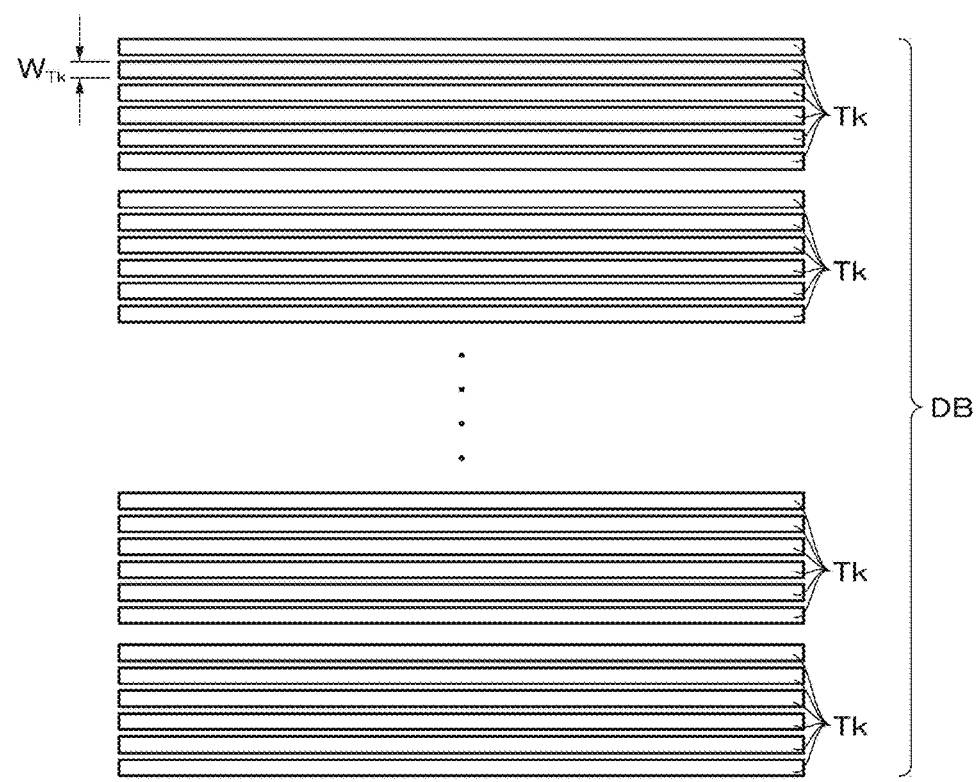

A servo pattern is recorded in the magnetic layer 13. For example, as depicted in FIG. 2A, the magnetic layer may have a plurality of servo bands SB and a plurality of data bands DB. The plurality of servo bands SB is provided at regular intervals in the width direction of the magnetic recording medium 10. Between the adjacent servo bands SB is provided the data band DB. Servo signals for performing tracking control of the magnetic head may be preliminarily written in the servo bands SB. User data can be recorded in the data bands DB.

The magnetic layer 13 can have, for example, at least one data band and at least two servo bands. The number of the data bands is, for example, 2 to 10, and may particularly be 3 to 6, more particularly 4 or 5. The number of the servo bands is, for example, 3 to 11, and may particularly be 4 to 7, more particularly 5 or 6. These servo bands and data bands may be disposed such as to extend, for example, in the longitudinal direction of the tape-shaped magnetic recording medium (particularly, the elongate magnetic recording tape), particularly to extend substantially in parallel to the longitudinal direction. As a magnetic recording medium thus having the data bands and the servo bands, a magnetic recording tape according to the LTO (Linear Tape-Open) standard may be mentioned. In other words, the magnetic recording medium according to the present technology may be a magnetic recording tape according to the LTO standard. For example, the magnetic recording medium according to the present technology may be a magnetic recording tape according to LTO 8 or subsequent standards.

The ration $R_s$ ($=(S_{SB}/S)\times100$) of the total area $S_{SB}$ of the servo bands SB to the area S of the whole surface of the magnetic layer 13 is preferably equal to or less than 4.0%, more preferably equal to or less than 3.0%, and further preferably equal to or less than 2.0% from the viewpoint of securing a high recording capacity.

Note that the servo band width $W_{SB}$ of the servo bands SB is preferably equal to or less than 95 µm, more preferably equal to or less than 60 µm, and further preferably equal to or less than 30 µm from the viewpoint of securing a high recording capacity. The servo band width $W_{SB}$ is preferably equal to or more than 10 µm from the viewpoint of manufacture of the recording head.

The magnetic layer 13 can have, for example, five or more servo bands. In order to secure five or more servo tracks, the ratio $R_S$ of the total area $S_{SB}$ of the servo bands SB to the area S of the surface of the magnetic layer 13 can be preferably equal to or more than 0.8%.

The ratio $R_S$ of the total area $S_{SB}$ of the servo bands SB to the area S of the whole surface of the magnetic layer 13 is determined in the manner as follows. For example, the magnetic recording medium 10 is developed by use of a ferri-colloid developing solution (SigMarker Q, produced by Sigma Hi-Chemical Inc.), thereafter the developed magnetic recording medium 10 is observed under an optical microscope, and the servo band width $W_{SB}$ and the number of the servo bands SB are measured. Next, the ratio $R_S$ is determined from the following formula.

Ratio $R_S$[%]=(((Servo band width $W_{SB}$)×(Number of servo bands))/(Width of magnetic recording medium 10))×100

(Recording Track)

As depicted in FIG. 2B, the magnetic layer 13 is configured in such a manner that a plurality of recording tracks (also called data tracks) Tk can be formed in the data band DB.

The recording track width $W_{Tk}$ may be, for example, equal to or less than 2.50 µm, preferably equal to or less than 2.20 µm, more preferably equal to or less than 2.00 µm, and further preferably equal to or less than 1.80 µm from the viewpoint of securing a high recording capacity.

The recording track width $W_{Tk}$ may be, for example, equal to or more than 0.10 µm, preferably equal to or more than 0.02 µm, and more preferably equal to or more than 0.30 µm from the viewpoint of magnetic particle size.

As above-mentioned, the magnetic layer 13 may be configured such that a plurality of recording tracks Tk can be formed in the data band DB. In other words, the magnetic recording medium 10 may not have recording tracks. In this case, the magnetic recording medium 10 may be used for forming, for example, the recording tracks with the recording track width in the above-mentioned numerical value range, or may be used on a magnetic recording apparatus that forms recording tracks with the recording track width in the above-mentioned numerical value range.

Alternatively, the magnetic recording medium 10 may have recording tracks. The recording tracks may have the recording track width in the above-mentioned numerical value range.

That the recording track width is in the above-mentioned numerical value range contributes to good recording or reproduction even after long-term preservation of the thin magnetic recording medium. In addition, that the recording track width is in the above-mentioned numerical value range contributes also to enhancement of SNR of the thin magnetic recording medium.

The recording track width $W_{Tk}$ is determined in the manner as follows. For example, a data recording pattern of a data band portion of the magnetic layer 13 with data recorded on the whole surface thereof is observed by use of an MFM (Magnetic Force Microscope), to obtain an MFM image. As the MFM, Dimension 3100 produced by Digital Instruments, Inc. and its analysis software are used. A measurement region of the MFM image is 10×10 μm, and the measurement region of 10×10 μm is divided into 512×512 (=262,144) measurement points. Measurement by the MFM is conducted for three different 10×10 μm measurement regions, to obtain three MFM images. From the thus obtained three MFM images, the track width is measured at ten positions, and the measurements are averaged (arithmetic mean), by use of the analysis software attached to Dimension 3100. The mean value is the recording track width $W_{Tk}$. The measurement conditions of the MFM are a sweeping rate of 1 Hz, a chip used of MFMR-20, a lift height of 20 nm, and a correction of Flatten order 3.

The magnetic layer 13 is configured to be able to record data such that a minimum of a magnetization reversal interval L is preferably equal to or less than 48 nm, more preferably equal to or less than 44 nm, and further preferably equal to or less than 40 nm from the viewpoint of securing a high recording capacity. The minimum of the magnetization reversal interval L is taken into account according to the magnetic particle size. The minimum of the magnetization reversal interval L is determined in the manner as follows. For example, a data recording pattern of a data band portion of the magnetic layer 13 with data recorded on the whole surface thereof is observed by an MFM (Magnetic Force Microscope), to obtain an MFM image. As the MFM, Dimension 3100 produced by Digital Instruments, Inc. and its analysis software are used. The measurement region of the MFM image is 2×2 μm, and the 2×2 μm measurement region is divided into 512×512 (=262,144) measurement points. Measurement by the MFM is conducted for three different 2×2 μm measurement regions, to obtain three MFM images. From a two-dimensional rugged chart of the record pattern of the MFM images thus obtained, 50 bit intervals are measured. The measurement of the bit intervals is performed by use of the analysis software attached to Dimension 3100. A value of approximately a greatest common divisor of the 50 bit intervals measured is made to be a minimum of the magnetization reversal interval L. Note that the measurement conditions are a sweeping rate of 1 Hz, a chip used of MFMR-20, a lift height of 20 nm, and a correction of Flatten order 3.

The magnetic recording medium 10 is preferably reproduced by use of a reproducing head having a reproduction track width of equal to or less than the recording track width.

The ratio of ((reproduction track width)/(recording track width)) of the magnetic recording medium 10 may be preferably equal to or less than 1.00, more preferably equal to or less than 0.90, and further preferably equal to or less than 0.85.

The ratio of ((reproduction track width)/(recording track width)) of the magnetic recording medium 10 may be preferably equal to or more than 0.50, more preferably equal to or more than 0.52, further preferably equal to or more than 0.54, equal to or more than 0.56, equal to or more than 0.58, or equal to or more than 0.60.

The ratio of ((reproduction track width)/(recording track width)) of the magnetic recording medium 10 may be, for example, from 0.50 to 1.00, μm, preferably from 0.52 to 0.90, more preferably from 0.56 to 0.85, and further preferably from 0.60 to 0.85.

That the ratio of ((reproduction track width)/(recording track width)) is within the above-mentioned numerical value range contributes to good reproduction even after long-term preservation of the thin magnetic recording medium. In addition, that the ratio of ((reproduction track width)/(recording track width)) is within the above-mentioned numerical value range contributes also to enhancement of SNR of the thin magnetic recording medium.

The magnetic recording medium 10 is suitable for use on a recording and reproduction apparatus including a reproducing head such that the above-mentioned ratio is within the above-mentioned numerical value range.

The reproduction track width may be selected, as required, by those skilled in the art taking into account the ratio of the ((reproduction track width)/(recording track width)). The reproduction track width is determined by the reproducing head used for reproduction of the magnetic recording medium 10.

The reproduction track width may be, for example, equal to or less than 2.00 μm, preferably equal to or less than 1.80 μm, more preferably equal to or less than 1.60 μm, and further preferably equal to or less than 1.40 μm.

The reproduction track width may be, for example, equal to or more than 0.20 μm, preferably equal to or more than 0.30 μm, more preferably equal to or more than 0.40 μm, and further preferably equal to or more than 0.50 μm.

The reproduction track width of the magnetic recording medium 10 may be within the above-mentioned numerical value range, and may be, for example, 0.40 to 2.50 μm, preferably 0.50 to 2.20 μm, and more preferably 0.60 to 2.00 μm.

(Specific Example of Servo Pattern)

Figure 3:
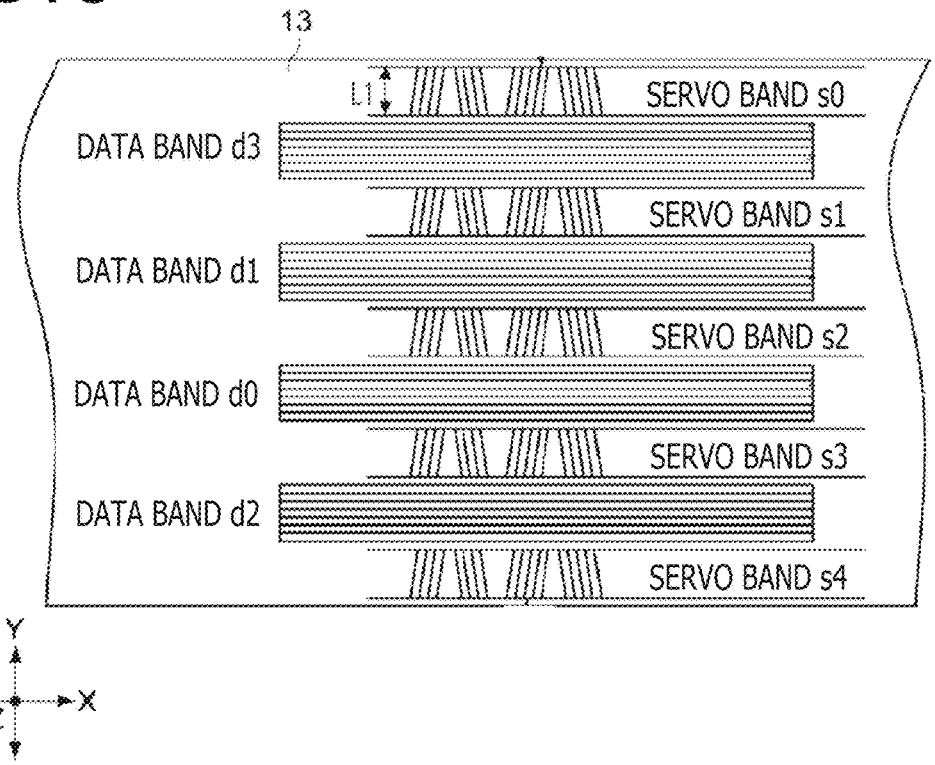
FIG. 3 is a diagram depicting an example of a servo pattern in the servo bands.
Figure 4:
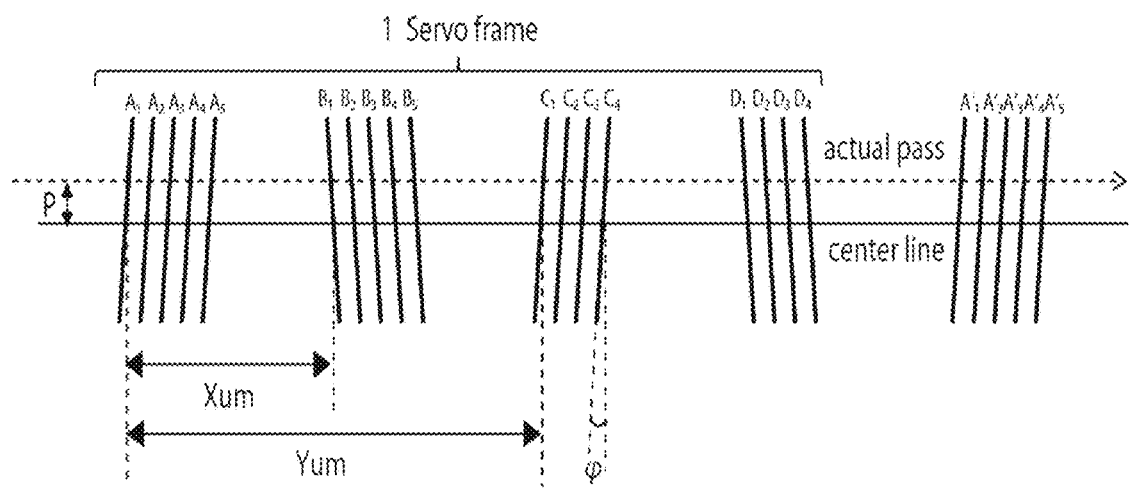
FIG. 4 is a diagram depicting an example of the servo pattern in the servo bands.

A more specific example of the servo pattern recorded in the magnetic layer 13 of the magnetic recording medium of the present technology will be described referring to FIGS. 3 and 4. FIG. 3 is a schematic diagram of data bands and servo bands formed in the magnetic layer 13 of the magnetic recording medium 10. FIG. 4 is a diagram depicting servo patterns possessed by each servo band.

As illustrated in FIG. 3, the magnetic layer 13 has four data bands d0 to d3. The magnetic layer 13 has a total of five servo bands S0 to S4 such that each data band is interposed between two servo bands.

As depicted in FIG. 4, each servo band has a repetition of frame units (single servo frame) each of which includes five rectilinear servo patterns (for example, servo patterns A1 to A5) inclined at a predetermined angle φ, five rectilinear servo patterns (for example, servo patterns B1 to B5) inclined at the same angle but in the opposite direction as compared to these signals, four rectilinear servo patterns (for example, servo patterns C1 to C4) inclined at the predetermined angle φ, and four rectilinear servo patterns (for example, servo patterns D1 to D4) inclined at the same angle but in the opposite direction as compared to these signals. The predetermined angle φ can be, for example, 5° to 25°, particularly 11° to 25°.

The servo band width L1 (see FIG. 3) of each of the servo bands S0 to S4 may be, for example, equal to or less than 100 μm, particularly equal to or less than 60 μm, more particularly equal to or less than 50 μm, and more particularly equal to or less than 40 μm. The servo band width L1 may be, for example, equal to or more than 15 μm, particularly equal to or more than 25 μm.

(Magnetic Powder)

Examples of magnetic particles constituting the magnetic powder included in the magnetic layer 13 include hexagonal ferrite, epsilon iron oxide (ε iron oxide), Co-containing spinel ferrite, gamma hematite, magnetite, chromium dioxide, cobalt-coated iron oxide, and metal, but these are not limitative. The magnetic powder may be one of these, and may be a combination of two or more of these. Preferably, the magnetic powder can include hexagonal ferrite, ε iron oxide, or Co-containing spinel ferrite. Particularly preferably, the magnetic powder is hexagonal ferrite. The hexagonal ferrite can particularly preferably contain at least one of Ba or Sr. The ε iron oxide can particularly preferably contain at least one of Al or Ga. These magnetic particles may be selected, as required, by those skilled in the art based on such factors as, for example, the manufacturing method of the magnetic layer 13, the standard of the tape, and the functions of the tape.

The shape of the magnetic particles depends on the crystal structure of the magnetic particles. For example, barium ferrite (BaFe) and strontium ferrite can be hexagonal plate-like in shape. The ε iron oxide can be spherical in shape. Cobalt ferrite can be cubic in shape. The metal can be spindle-shaped. In the manufacturing process of the magnetic recording medium 10, these magnetic particles are oriented.

The average particle size of the magnetic powder can be preferably equal to or less than 50 nm, more preferably equal to or less than 40 nm, further preferably equal to or less than 30 nm, equal to or less than 25 nm, equal to or less than 22 nm, equal to or less than 21 nm, or equal to or less than 20 nm. The average particle size can be, for example, equal to or more than 10 nm, and preferably equal to or more than 12 nm.

The average aspect ratio of the magnetic powder can be preferably 1.0 to 3.5, more preferably 1.0 to 3.1, further preferably 1.0 to 2.8, and particularly preferably 1.1 to 2.5.

(Embodiment in which Magnetic Powder Includes Hexagonal Ferrite)

According to a preferred embodiment of the present technology, the magnetic powder can include hexagonal ferrite, more particularly a powder of nanoparticles containing hexagonal ferrite (hereinafter referred to as "hexagonal ferrite particles"). The hexagonal ferrite particles have, for example, a hexagonal plate-like shape or a substantially hexagonal plate-like shape. The hexagonal ferrite can contain at least one of Ba, Sr, Pb, or Ca, preferably at least one of Ba or Sr. Specifically, the hexagonal ferrite may be barium ferrite or strontium ferrite. The barium ferrite may further contain at least one of Sr, Pb, or Ca, in addition to Ba. The strontium ferrite may further contain at least one of Ba, Pb, or Ca, in addition to Sr.

More specifically, the hexagonal ferrite can have an average composition represented by the general formula $MFe_{12}O_{19}$. Here, M is, for example, at least one metal of Ba, Sr, Pb, or Ca, and preferably at least one metal of Ba or Sr. The M may be a combination of Ba with at least one metal selected from the group including Sr, Pb, and Ca. In addition, the M may be a combination of Sr with at least one metal selected from the group including Ba, Pb, and Ca. In the above general formula, part of Fe may be replaced by other metallic element.

In the case where the magnetic powder includes a powder of hexagonal ferrite particles, the average particle size of the magnetic powder can be preferably equal to or less than 50 nm, more preferably equal to or less than 40 nm, further preferably equal to or less than 30 nm, equal to or less than 25 nm, equal to or less than 22 nm, equal to or less than 21 nm, or equal to or less than 20 nm. The average particle size can be, for example, equal to or more than 10 nm, preferably equal to or more than 12 nm, and more preferably equal to or more than 15 nm. For example, the average particle size of the magnetic powder can be 10 to 50 nm, 10 to 40 nm, 12 to 30 nm, 12 to 25 nm, or 15 to 22 nm. In the case where the average particle size of the magnetic powder is equal to or less than the above-mentioned upper limit (for example, in the case where the average particle size is equal to or less than 50 nm, particularly equal to or less than 30 nm), good electromagnetic conversion characteristics (for example, SNR) can be obtained in the high recording density magnetic recording medium 10. In the case where the average particle size of the magnetic powder is equal to or more than the above-mentioned lower limit (for example, in the case where the average particle size is equal to or more than 10 nm, preferably equal to or more than 12 nm), dispersibility of the magnetic powder is enhanced more, and more excellent electromagnetic conversion characteristics (for example, SNR) can be obtained.

In the case where the magnetic powder includes a powder of hexagonal ferrite particles, the average aspect ratio of the magnetic powder can be preferably from 1 to 3.5, more preferably from 1 to 3.1, or from 2 to 3.1, and further preferably from 2 to 3. With the average aspect ratio of the magnetic powder within the above-mentioned numerical value range, coagulation of the magnetic powder can be restrained, and, further, at the time of perpendicular orientation of the magnetic powder in the step of forming the magnetic layer 13, resistance exerted on the magnetic powder can be restrained. This offers enhancement of perpendicular orientability of the magnetic powder.

In the case where the magnetic powder includes a powder of hexagonal ferrite particles, the average particle size and the average aspect ratio of the magnetic powder are determined in the manner as follows.

First, thinning of the magnetic recording medium 10 as an object of measurement is conducted by processing by an FIB (Focused Ion Beam) method or the like. In the case of using the FIB method, as a pretreatment for observation of a TEM image of a section described later, a carbon film and a tungsten thin film are formed as protective films. The carbon film is formed on the magnetic layer side surface and the back layer side surface of the magnetic recording medium 10 by a vapor deposition method. The tungsten thin film is further formed over the magnetic layer side surface by a vapor deposition method or a sputtering method. The thinning is conducted along the lengthwise direction (longitudinal direction) of the magnetic recording medium 10. In other words, by the thinning, a section parallel to both the longitudinal direction and the thickness direction of the magnetic recording medium 10 is formed.

The section of the thinned sample thus obtained is subjected to section observation such that the whole part of the magnetic layer 13 is included in regard of the thickness direction of the magnetic layer 13, by use of a transmission electron microscope (H-9500, produced by Hitachi High- Technologies Corporation) at an acceleration voltage of 200 kV and a comprehensive magnification of 500,000 times, to pick up a TEM photograph.

Figure 9:
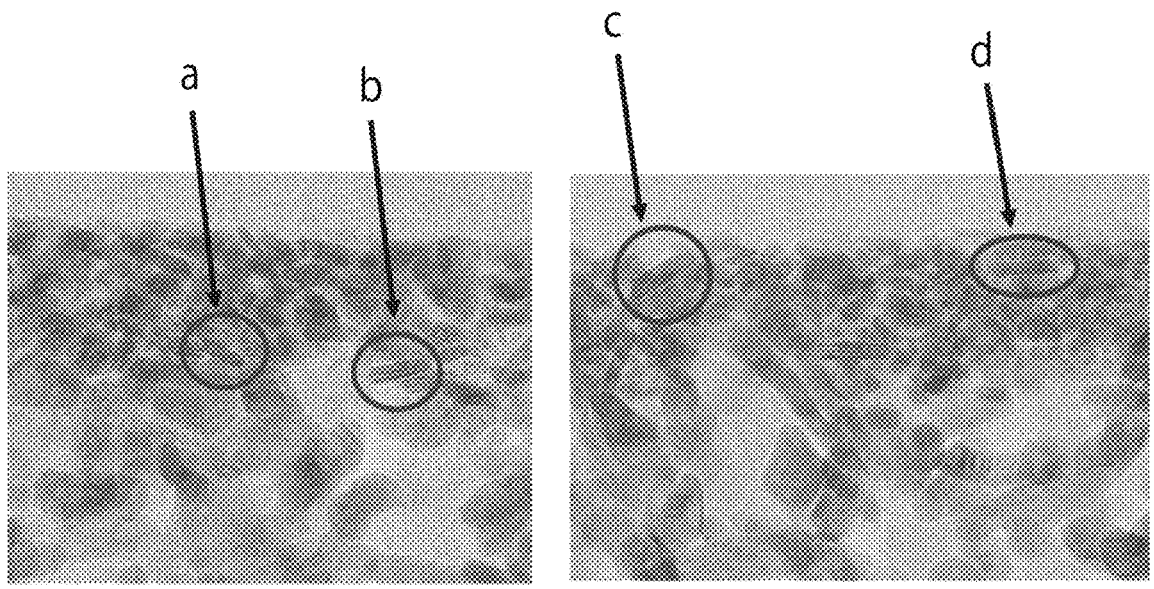
FIG. 9 is an example of a TEM photograph of a magnetic layer.

Next, from the thus picked up TEM photograph, 50 particles are selected which have side surfaces oriented in the direction of an observed surface and have a particle thickness clearly observable. For example, FIG. 9 depicts an example of the TEM photograph. In FIG. 9, for example, particles denoted by a and d are selected since their thickness can be clearly observed. The respective maximum plate thicknesses DA of the selected 50 particles are measured. The maximum plate thicknesses DA thus obtained are simply averaged (arithmetic mean), to determine an average maximum plate thickness $DA_{ave}$.

Subsequently, the plate diameter DB of each magnetic powder is measured. For measuring the plate diameter DB of the particles, from the TEM photograph picked up, 50 particles are selected which have a particle plate diameter clearly observable. For example, in FIG. 9, for example, the particles denoted by b and c are selected from their plate diameters are clearly observable. The respective plate diameters DB of the selected 50 particles are measured. The plate diameters DB thus obtained are simply averaged (arithmetic mean), to determine an average plate diameter $DB_{ave}$. The average plate diameter $DB_{ave}$ is the average particle size.

Then, from the average maximum plate thickness $DA_{ave}$ and the average plate diameter $DB_{ave}$, the average aspect ratio ($DB_{ave}/DA_{ave}$) of the particles is determined.

In the case where the magnetic powder includes a powder of hexagonal ferrite particles, the average particle volume of the magnetic powder is preferably equal to or less than 5,900 nm³, more preferably equal to or less than 3,400 nm³, further preferably equal to or less than 2,500 nm³, still further preferably equal to or less than 1,500 nm³, and particularly preferably equal to or less than 1,300 nm³. In addition, the average particle volume of the magnetic powder is preferably 500 to 3,400 nm³, more preferably 1,000 to 2,500 nm³, further preferably 1,000 to 1,500 nm³, and still further preferably 1,000 to 1,300 nm³.

In the case where the average particle volume of the magnetic powder is equal to or less than the above-mentioned upper limit (for example, where the average particle volume is equal to or less than 5,900 nm³), good electromagnetic conversion characteristics (for example, SNR) can be obtained in the high recording density magnetic recording medium 10. In the case where the average particle volume of the magnetic powder is equal to or more than the above-mentioned lower limit (for example, where the average particle volume is equal to or more than 500 nm³), dispersibility of the magnetic powder is enhanced, and more excellent electromagnetic conversion characteristics (for example, SNR) can be obtained.

The average particle volume of the magnetic powder is determined in the manner as follows. First, the average maximum plate thickness $DA_{ave}$ and the average plate diameter $DB_{ave}$ are determined, as described above concerning the method of calculating the average particle size of the magnetic powder. Next, the average volume V of the magnetic powder is determined from the following formula.

$$V = \frac{3\sqrt{3}}{8} \times DA_{ave} \times DB_{ave} \times DB_{ave}$$

According to a preferred embodiment of the present technology, the magnetic powder can be a barium ferrite magnetic powder or a strontium ferrite magnetic powder, preferably a barium ferrite magnetic powder. The barium ferrite magnetic powder includes magnetic particles of iron oxide containing barium ferrite as a main phase (hereinafter referred to as "barium ferrite particles"). The barium ferrite magnetic powder is high in reliability of data recording, such as, for example, coercive force not being lowered even in a high-temperature high-humidity environment. From such a viewpoint, the barium ferrite magnetic powder is preferable as the above-mentioned magnetic powder.

The average particle size of the barium ferrite magnetic powder is equal to or less than 50 nm, preferably 10 to 40 nm, and more preferably 12 to 25 nm.

In the case where the magnetic layer 13 includes a barium ferrite magnetic powder as a magnetic powder, the average thickness $t_m$ [nm] of the magnetic layer 13 is preferably 35 nm≤$t_m$≤100 nm, and particularly preferably equal to or less than 80 nm.

In addition, the coercive force Hc measured in the thickness direction (perpendicular direction) of the magnetic recording medium 10 is preferably 160 to 280 kA/m, more preferably 165 to 275 kA/m, and further preferably 170 to 270 kA/m. The coercive force Hc may be preferably equal to or less than 240 kA/m, more preferably equal to or less than 225 kA/m, further preferably equal to or less than 210 kA/m, and still further preferably equal to or less than 200 kA/m.

(Embodiment in which Magnetic Powder Includes ε Iron Oxide)

According to another preferred embodiment of the present technology, the magnetic powder can preferably include a powder of nanoparticles containing ε iron oxide (hereinafter referred to as "ε iron oxide particles"). The ε iron oxide particles can obtain a high coercive force, notwithstanding they are fine particles. The ε iron oxide contained in the ε iron oxide particles is preferably crystal oriented preferentially in the thickness direction (perpendicular direction) of the magnetic recording medium 10.

The ε iron oxide particles have a spherical shape or a substantially spherical shape, or have a cubic shape or a substantially cubic shape. Since the ε iron oxide particles have such a shape, in the case where the ε iron oxide particles are used as the magnetic particles, the contact area between the particles in the thickness direction of the medium can be reduced, and coagulation of the particles can be restrained, as compared to the case of using hexagonal plate-shaped barium ferrite particles as the magnetic particles. Therefore, dispersibility of the magnetic powder can be obtained, and a better SNR (Signal-to Noise Ratio) can be obtained.

Figure 5:
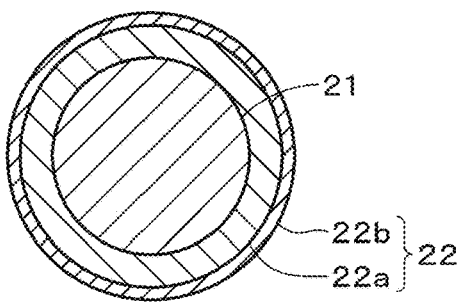
FIG. 5 is a sectional view depicting a configuration of a magnetic particle.

The ε iron oxide particles have a core-shell type structure. Specifically, as illustrated in FIG. 5, the ε iron oxide particles have a core part 21, and a shell part 22 of a two-layer structure provided in the periphery of the core part 21. The shell part 22 of the two-layer structure includes a first shell part 22a provided on the core part 21, and a second shell part 22b provided on the first shell part 22a.

The core part 21 contains ε iron oxide. The ε iron oxide contained in the core part 21 preferably contains ε-Fe₂O₃ crystal as a main phase, and more preferably includes a single phase of ε-Fe₂O₃.

The first shell part 22a covers at least part of the periphery of the core part 21. Specifically, the first shell part 22a may cover partially the periphery of the core part 21, or may cover the whole part of the periphery of the core part 21. It is preferable that the first shell part 22a covers the whole part of the surface of the core part 21 from the viewpoint of securing sufficient exchange coupling between the core part 21 and the first shell part 22a and enhancing magnetic characteristics.

The first shell part 22a is a so-called soft magnetic layer, and may include a soft magnetic material such as, for example, α-Fe, a Ni—Fe alloy or a Fe—Si—Al alloy. The α-Fe may be obtained by reducing ε iron oxide contained in the core part 21.

The second shell part 22b is an oxide coating as an oxidation-preventive layer. The second shell part 22b can include α iron oxide, aluminum oxide, or silicon oxide. The α iron oxide can include at least one iron oxide of, for example, $Fe_3O_4$, $Fe_2O_3$, and FeO. In the case where the first shell part 22a includes α-Fe (soft magnetic material), the α iron oxide may be obtained by oxidizing the α-Fe contained in the first shell part 22a.

With the ε iron oxide particles having the first shell part 22a as aforementioned, thermal stability can be secured, so that the coercive force Hc of the core part 21 alone can be maintained at a high value and/or the coercive force Hc of the ε iron oxide particles (core-shell particles) as a whole can be adjusted to a coercive force Hc suitable for recording. In addition, with the ε iron oxide particles having the second shell part 22b as aforementioned, the characteristics of the ε iron oxide particles can be restrained from being lowered, due to generation of rust or the like on the particle surfaces due to exposure of the ε iron oxide particles to air, during or before the manufacturing process of the magnetic recording medium 10. Therefore, deterioration of characteristics of the magnetic recording medium 10 can be restrained.

Figure 6:
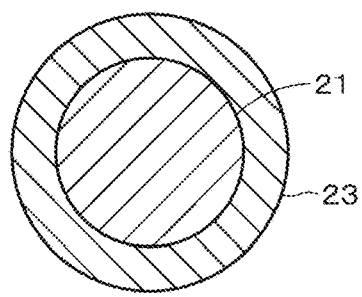
FIG. 6 is a sectional view depicting a configuration of a magnetic particle in a modification.

The ε iron oxide particles may have a shell part 23 of a monolayer structure, as depicted in FIG. 6. In this case, the shell part 23 has a configuration similar to that of the first shell part 22a. It is to be noted, however, that it is preferred that the ε iron oxide particles have the shell part 22 of a two-layer structure from the viewpoint of restraining deterioration of characteristics of the ε iron oxide particles.

The ε iron oxide particles may include an additive in place of the core-shell structure, or, alternatively, the ε iron oxide particles may have a core-shell structure and includes an additive. In these cases, part of Fe of the ε iron oxide particles is replaced by the additive. That the ε iron oxide particles include an additive enables the coercive force Hc of the ε iron oxide particles as a whole to be adjusted to a coercive force Hc suitable for recording, and, therefore, makes it possible to enhance ease of recording. The additive is a metallic element other than iron, is preferably a trivalent metallic element, and is more preferably at least one selected from the group including aluminum (Al), gallium (Ga), and indium (In).

Specifically, the ε iron oxide containing an additive is $\varepsilon\text{-Fe}_{2-x}M_xO_3$ crystal (here M is a metallic element other than iron, preferably a trivalent metallic element, more preferably at least one selected from the group including Al, Ga, and In, and x is, for example, $0<x<1$).

The average particle size (average maximum particle size) of the magnetic powder is preferably equal to or less than 22 nm, more preferably 8 to 22 nm, and further preferably 12 to 22 nm. In the magnetic recording medium 10, a region of a size of ½ times the recording wavelength is an actual magnetization region. Therefore, by setting the average particle size of the magnetic powder to a value of equal to or less than a shortest recording wavelength, good SNR can be obtained. For this reason, when the average particle size of the magnetic powder is equal to or less than 22 nm, good electromagnetic conversion characteristics (for example, SNR) can be obtained in the high recording density magnetic recording medium 10 (for example, the magnetic recording medium 10 configured to be able to record signals with a shortest recording wavelength of equal to or less than 44 nm). On the other hand, when the average particle size of the magnetic powder is equal to or more than 8 nm, dispersibility of the magnetic powder is enhanced more, and more excellent electromagnetic conversion characteristics (for example, SNR) can be obtained.

The average aspect ratio of the magnetic powder is preferably from 1.0 to 3.5, more preferably from 1.0 to 3.1, and further preferably from 1.0 to 2.5. When the average aspect ratio of the magnetic powder is in the range from 1.0 to 3.5, coagulation of the magnetic powder can be restrained, and, at the time of perpendicular orientation of the magnetic powder in the step of forming the magnetic layer 13, resistance exerted on the magnetic powder can be restrained. Therefore, perpendicular orientability of the magnetic powder can be enhanced.

In the case where the magnetic powder includes ε iron oxide particles, the average particle size and the average aspect ratio of the magnetic powder are determined in the manner as follows.

First, thinning of the magnetic recording medium 10 as an object of measurement is conducted by processing by an FIB (Focused Ion Beam) method or the like. In the case of using the FIB method, as a pretreatment for observation of a TEM image of a section described later, a carbon film and a tungsten thin film are formed as protective films. The carbon film is formed on the magnetic layer side surface and the back layer side surface of the magnetic recording medium 10 by a vapor deposition method. The tungsten thin film is further formed over the magnetic layer side surface by a vapor deposition method or a sputtering method. The thinning is conducted along the lengthwise direction (longitudinal direction) of the magnetic recording medium 10. In other words, by the thinning, a section parallel to both the longitudinal direction and the thickness direction of the magnetic recording medium 10 is formed.

The section of the thinned sample thus obtained is subjected to section observation such that the whole part of the magnetic layer 13 is included in regard of the thickness direction of the magnetic layer 13 by use of a transmission electron microscope (H-9500, produced by Hitachi High-Technologies Corporation) at an acceleration voltage of 200 kV and a comprehensive magnification of 500,000 times, to pick up a TEM photograph.

Next, from the TEM photograph picked up, 50 particles are selected which have a particle shape clearly observable, and a long axis length DL and a short axis length DS of each of the particles are measured. Here, the long axis length DL means the maximum one of the distances between two parallel lines of parallel lines drawn at every angle such as to touch the profile of each particle (so-called maximum Feret's diameter). On the other hand, the short axis length DS means the maximum one of particle lengths in a direction orthogonal to the long axis (DL) of the particle.

Subsequently, the long-axis lengths DL of the 50 particles thus measured are simply averaged (arithmetic mean), to determine an average long-axis length $DL_{ave}$. The average long-axis length $DL_{ave}$ obtained in this way is made to be the average particle size of the magnetic powder. In addition, the short-axis lengths DS of the 50 particles measured are simply averaged (arithmetic mean), to determine an average short-axis length $DS_{ave}$. Then, an average aspect ratio ($DL_{ave}/DS_{ave}$) of the particles is determined from the average long-axis length $DL_{ave}$ and the average short-axis length $DS_{ave}$.

The average particle volume of the magnetic powder is preferably equal to or less than 5,500 nm³, more preferably 270 to 5,500 nm³, and further preferably 900 to 5,500 nm³. When the average particle volume of the magnetic powder is equal to or less than 5,500 nm³, an effect similar to that in the case where the average particle size of the magnetic powder is set to be equal to or less than 22 nm can be obtained. On the other hand, when the average particle volume of the magnetic powder is equal to or more than 270 nm³, an effect similar to that in the case where the average particle size of the magnetic powder is set to be equal to or more than 8 nm can be obtained.

In the case where the ε iron oxide particles have a spherical shape or a substantially spherical shape, the average particle volume of the magnetic powder is determined in the manner as follows. First, the average long-axis length $DL_{ave}$ is determined, similarly to the method of calculating the average particle size of the magnetic powder described above. Next, the average volume V of the magnetic powder is determined from the following formula.

$$V = (\pi/6) \times DL_{ave}^3$$

In the case where the ε iron oxide particles have a cubic shape, the average volume of the magnetic powder is determined in the manner as follows.

The magnetic recording medium 10 is subjected to thinning by processing by an FIB (Focused Ion Beam) method or the like. In the case of using the FIB method, as a pretreatment for observation of a TEM image of a section described later, a carbon film and a tungsten thin film are formed as protective films. The carbon film is formed on the magnetic layer side surface and the back layer side surface of the magnetic recording medium 10 by a vapor deposition method, and the tungsten thin film is further formed over the magnetic layer side surface by a vapor deposition method or a sputtering method. The thinning is conducted along the lengthwise direction (longitudinal direction) of the magnetic recording medium 10. In other words, by the thinning, a section parallel to both the longitudinal direction and the thickness direction of the magnetic recording medium 10 is formed.

The thinned sample thus obtained is subjected to section observation such that the whole part of the magnetic layer 13 is included in regard to the thickness direction of the magnetic layer 13 by use of a transmission electron microscope (H-9500, produced by Hitachi High-Technologies Corporation) at an acceleration voltage of 200 kV and a comprehensive magnification of 500,000 times, to obtain a TEM photograph. Note that the magnification and the acceleration voltage may be adjusted, as required, according to the kind of the apparatus.

Next, from the TEM photograph picked up, 50 particles are selected which have a clear particle shape, and a length DC of a side of each particle is measured. Subsequently, the lengths DC of the sides of the 50 particles thus measured are simply averaged (arithmetic mean), to determine an average side length $DC_{ave}$. Next, by using the average side length $DC_{ave}$, an average volume $V_{ave}$ (particle volume) of the magnetic powder is determined from the following formula.

$$V_{ave} = DC_{ave}^3$$

(Embodiment in Which Magnetic Powder Includes Co-Containing Spinel Ferrite)

According to a further preferred embodiment of the present technology, the magnetic powder can include a powder of nanoparticles including Co-containing spinel ferrite (hereinafter referred to as "cobalt ferrite particles").

In other words, the magnetic powder can be cobalt ferrite magnetic powder. The cobalt ferrite particles preferably have uniaxial crystal anisotropy. The cobalt ferrite magnetic particles have, for example, a cubic shape or a substantially cubic shape. The Co-containing spinel ferrite may further contain at least one selected from the group including Ni, Mn, Al, Cu, and Zn, other than Co.

The cobalt ferrite has, for example, an average composition represented by the following formula (1).

$$Co_x M_y Fe_2 O_z \quad (1)$$

(In the formula (1), M is at least one metal selected from the group including, for example, Ni, Mn, Al, Cu, and Zn. X is a value in the range of $0.4 \le x \le 1.0$. y is a value in the range of $0 \le y \le 0.3$. It is to be noted that x and y satisfy the relation of $(x+y) \le 1.0$. z is a value in the range of $3 \le z \le 4$. Part of Fe may be replaced by other metallic element.)

The average particle size of the cobalt ferrite magnetic powder is preferably equal to or less than 25 nm, and more preferably equal to or less than 23 nm. The coercive force Hc of the cobalt ferrite magnetic powder is preferably equal to or more than 2,500 Oe, and more preferably 2,600 to 3,500 Oe.

In the case where the magnetic powder includes a powder of cobalt ferrite particles, the average particle size of the magnetic powder is preferably equal to or less than 25 nm, and more preferably 10 to 23 nm. When the average particle size of the magnetic powder is equal to or less than 25 nm, good electromagnetic conversion characteristics (for example, SNR) can be obtained in the high recording density magnetic recording medium 10. On the other hand, when the average particle size of the magnetic powder is equal to or more than 10 nm, dispersibility of the magnetic powder is enhanced more, and more excellent electromagnetic conversion characteristics (for example, SNR) can be obtained. In the case where the magnetic powder includes the powder of cobalt ferrite particles, the average aspect ratio and the average particle size of the magnetic powder are determined by the same method as in the case where the magnetic powder includes the ε iron oxide particles.

The average particle volume of the magnetic powder is preferably equal to or less than 15,000 nm³, and more preferably 1,000 to 12,000 nm³. When the average particle volume of the magnetic powder is equal to or less than 15,000 nm³, an effect similar to that in the case where the average particle size of the magnetic powder is set to be equal to or less than 25 nm is obtained. On the other hand, when the average particle volume of the magnetic powder is equal to or more than 1,000 nm³, an effect similar to that in the case where the average particle size of the magnetic powder is set to be equal to or more than 10 nm is obtained. Note that the average particle volume of the magnetic powder is the same as the calculating method for the average particle volume in the case where the ε iron oxide particles have a cubic shape.

(Lubricant)

The magnetic layer includes a lubricant. The lubricant may be, for example, one or two or more selected from fatty acids and/or fatty acid esters, and more preferably may include both a fatty acid and a fatty acid ester. The fatty acid may preferably be a compound represented by the following general formula (1) or (2). For example, one of or both a compound represented by the following general formula (1) and a compound represented by the following general formula (2) may be included as the fatty acid.

In addition, the fatty acid ester may preferably be a compound represented by the following general formula (3)

or (4). For example, one of or both a compound represented by the following general formula (3) and a compound represented by the following general formula (4) may be included as the fatty acid ester.

When the lubricant includes either one of or both a compound represented by the general formula (1) and a compound represented by the general formula (2) as well as either one of or both a compound represented by the general formula (3) and a compound represented by the general formula (4), it is thereby possible to restrain an increase in dynamic frictional coefficient due to repeated recording or reproduction of the magnetic recording medium.

$$CH_3(CH_2)_k COOH \tag{1}$$

(In the general formula (1), k is an integer selected from a range of 14 to 22, μm, preferably from a range of 14 to 18.)

$$CH_3(CH_2)_n CH=CH(CH_2)_m COOH \tag{2}$$

(In the general formula (2), the sum of n and m is an integer selected from a range of 12 to 20, preferably from a range of 14 to 18.)

$$CH_3(CH_2)_p COO(CH_2)_q CH_3 \tag{3}$$

(In the general formula (3), p is an integer selected from a range of 14 to 22, μm, preferably from a range of 14 to 18, and q is an integer selected from a range of 2 to 5, preferably from a range of 2 to 4.)

$$CH_3(CH_2)_r COO-(CH_2)_s CH(CH_3)_2 \tag{4}$$

(In the general formula (4), r is an integer selected from a range of 14 to 22, and s is an integer selected from a range of 1 to 3.)

(Binder)

As a binder, preferred is a resin having a structure obtained by subjecting a polyurethane resin or a vinyl chloride resin or the like to a cross-linking reaction. However, the binder is not limited to these, and other resins may be blended, as required, according to, for example, physical properties required of the magnetic recording medium 10. The resins to be blended are not particularly limited, so long as they are resins generally used for a coating-type magnetic recording medium 10.

Examples of the material which may be used as the binder include one or a combination of two or more selected from polyvinyl chloride, polyvinyl acetate, vinyl chloride-vinyl acetate copolymer, vinyl chloride-vinylidene chloride copolymer, vinyl chloride-acrylonitrile copolymer, acrylic acid ester-acrylonitrile copolymer, acrylic acid ester-vinyl chloride-vinylidene chloride copolymer, acrylic acid ester-vinylidene chloride copolymer, methacrylic acid ester-vinylidene chloride copolymer, methacrylic acid ester-vinyl chloride copolymer, methacrylic acid ester-ethylene copolymer, polyvinyl fluoride, vinylidene chloride-acrylonitrile copolymer, acrylonitrile-butadiene copolymer, polyamide resins, polyvinyl butyral, cellulose derivatives (cellulose acetate butyrate, cellulose diacetate, cellulose triacetate, cellulose propionate, nitrocellulose), styrene-butadiene copolymer, polyester resins, amino resins, and synthetic rubbers.

In addition, a thermosetting resin or a reaction type resin may be used as the binder. Examples of the thermosetting resin or the reaction type resin include phenolic resins, epoxy resins, urea resin, melamine resin, alkyd resin, silicone resins, polyamine resin, and urea-formaldehyde resin.

Besides, a polar functional group such as $-SO_3M$, $-OSO_3M$, $-COOM$, and $P=O(OM)_2$ may be introduced into the aforementioned binder, for the purpose of enhancing the dispersibility of the magnetic powder. Here, M in the formulas is a hydrogen atom or an alkali metal such as lithium, potassium, and sodium.

Further, examples of the polar functional group include side chain type ones having a terminal group of $-NR1R2$ or $-NR1R2R3^+X^-$, and main chain type ones of $>NR1R2^+X^-$. Here, R1, R2, and R3 in the formulas are independently a hydrogen atom or a hydrocarbon group, and $X^-$ is a halogen element ion such as, for example, fluorine, chlorine, bromine, and iodine, or an inorganic or organic ion. In addition, examples of the polar functional group further include $-OH$, $-SH$, $-CN$ and epoxy group.

(Additive)

The magnetic layer 13 may further include nonmagnetic reinforcing particles such as particles of aluminum oxide (α, β, or γ alumina), chromium oxide, silicon oxide, diamond, garnet, emery, boron nitride, titanium carbide, silicon carbide, titanium carbide, titanium oxide (rutile type or anatase type titanium oxide), and the like.

(Ground Layer)

The ground layer 12 is a nonmagnetic layer containing a nonmagnetic powder and a binder as main constituents. The ground layer 12 further includes a lubricant. The description concerning the binder and the lubricant included in the aforementioned magnetic layer 13 applies also to the binder and the lubricant included in the ground layer 12. The ground layer 12 may further contain at least one additive selected from among conductive particles, a curing agent, a rust preventive agent, and the like, as required. The ground layer preferably includes a binder, more preferably includes a polyurethane resin as a binder, and particularly preferably includes a combination of a polyurethane resin and a vinyl chloride resin. The glass transition temperature of the polyurethane resin is preferably 10° C. to 140° C., more preferably 30° C. to 130° C., further preferably 30° C. to 120° C., and still further preferably 55° C. to 120° C.

The average thickness of the ground layer 12 is preferably 0.6 to 2.0 μm, and more preferably 0.8 to 1.4 μm. Note that the average thickness of the ground layer 12 is determined similarly to the average thickness $t_m$ of the magnetic layer 13. It is to be noted, however, that the magnification of the TEM image is adjusted, as required, according to the thickness of the ground layer 12.

(Nonmagnetic Powder)

The nonmagnetic powder contained in the ground layer 12 may include, for example, at least one kind selected from inorganic particles and organic particles. One kind of nonmagnetic powder may be used singly, or two or more kinds of nonmagnetic powders may be used in combination. The inorganic particles include, for example, one kind or a combination of two or more kinds selected from among metals, metal oxides, metal carbonates, metal sulfates, metal nitrides, metal carbides, and metal sulfide. More specifically, the inorganic particles can be, for example, one kind or two or more kinds selected from among iron oxyhydroxide, hematite, titanium oxide, and carbon black. Examples of the shape of the nonmagnetic powder include acicular, spherical, cubic, and plate-like shapes, but these are not limitative.

(Back Layer)

The back layer 14 can contain a binder and a nonmagnetic powder. The back layer 14 may contain various additives such as a lubricant, a curing agent, and an antistatic agent, as required. The description concerning the binder and the nonmagnetic powder included in the aforementioned ground layer 12 applies also to the binder and the nonmagnetic powder included in the back layer 14.

The average thickness $t_b$ of the back layer 14 is preferably $t_b \leq 0.6$ μm, and more preferably $t_b \leq 0.2$ With the average thickness $t_b$ of the back layer 14 within the above-mentioned range, the thicknesses of the ground layer 12 and the base layer 11 can be kept large, and traveling stability of the magnetic recording medium 10 in a recording and reproduction apparatus can be thereby maintained, even in the case where the average thickness $t_T$ of the magnetic recording medium 10 is set to be $t_T \leq 5.6$ μm.

The average thickness $t_b$ of the back layer 14 is determined in the manner as follows. First, the average thickness $t_T$ of the magnetic recording medium 10 is measured. The method for measuring the average thickness $t_T$ is as described in the following "(3) Physical properties and structure." Subsequently, the back layer 14 of the sample is removed by a solvent such as MEK (methyl ethyl ketone) or diluted hydrochloric acid. Next, the thickness of the sample is measured at five or more positions by use of a laser holographic gauge (LGH-110C) produced by Mitutoyo Corporation, and the measurements are simply averaged (arithmetic mean) to calculate an average $t_B$ [μm]. Thereafter, the average thickness $t_b$ [μm] of the back layer 14 is determined from the following formula. Note that the measurement positions are selected at random from the sample.

$$t_b [\mu m] = t_T [\mu m] - t_B [\mu m]$$

Of the two surfaces of the back layer 14, the surface constituting the back layer side surface of the magnetic recording medium 10 is preferably provided with a multiplicity of projected portions. With the magnetic recording medium 10 taken up in a roll form, the magnetic layer 13 can be formed with a multiplicity of micropores by the multiplicity of projected portions.

The projected portions can be formed, for example, by containing particles in the back layer forming coating material. The particles can be inorganic particles of, for example, carbon black. The particle diameter of the particles can be selected, as required, according to the size of the micropores to be formed in the magnetic layer 13.

The average particle size of the particles (particularly, the inorganic particles) contained in the back layer 14 is preferably 10 to 300 nm, and more particularly 20 to 270 nm. The average particle size of the nonmagnetic powder is determined similarly to the average particle size of the above-mentioned magnetic powder. In addition, the nonmagnetic powder may have two or more particle size distributions.

(3) Physical Properties and Structure
(Average Thickness $t_T$ of Magnetic Recording Medium)

The average thickness $t_T$ of the magnetic recording medium 10 can be $t_T \leq 5.4$ μm, preferably may be equal to or less than 5.3 μm, more preferably equal to or less than 5.2 μm, equal to or less than 5.0 μm, or equal to or less than 4.6 μm. With the average thickness $t_T$ of the magnetic recording medium 10 within the above-mentioned numerical value range (for example, with $t_T \leq 5.4$ μm), the recording capacity that can be recorded in one data cartridge can be enhanced as compared to the related art. A lower limit for the average thickness $t_T$ of the magnetic recording medium 10 is not particularly limited and is, for example, 3.5 μm $\leq t_T$.

The average thickness $t_T$ of the magnetic recording medium 10 is determined in the manner as follows. First, a magnetic recording medium 10 with a width of ½ inch is prepared and is cut to a length of 250 mm to produce a sample. Next, the thickness of the sample is measured at five or more positions by use of a laser holographic gauge (LGH-110C) produced by Mitutoyo Corporation as a measuring instrument, and the measurements are simply averaged (arithmetic mean) to calculate the average $t_T$ [μm]. Note that the measurement positions are selected at random from the sample.

(Viscosity Term E" and Elasticity Term E')

When the magnetic recording medium 10 is subjected to dynamic viscoelasticity measurement, the difference between a maximum and a minimum of viscosity term E" in a temperature range of 0° C. to 80° C. is equal to or less than 0.18 GPa, and is preferably 0.17 GPa. With the difference within this numerical value range, reproduction or recording with the magnetic recording medium having a small overall thickness can be performed favorably even after long-term preservation. In the case where the difference is equal to or more than 0.18 GPa, it is considered that strain generated particularly in a step in which the magnetic recording medium is subjected to high temperature for a long time (for example, a curing step) remains in the magnetic recording medium (for example, the strain in the longitudinal direction in which a tension is exerted remains), and, when the produced magnetic recording medium is preserved for a long time, the strain is mitigated and deformation in the direction for mitigation is thereby enlarged (for example, shrinking in the longitudinal direction occurs and the size in the width direction increases).

In addition, the above-mentioned difference may be, for example, equal to or more than 0, and a value of closer to 0 is better. Note that taking into account that a polymer of an organic polymer can be used as the material for the base layer, the difference may be, for example, equal to or more than 0.01 GPa, and may further be equal to or more than 0.03 GPa.

Besides, in some preferred embodiments of the present invention, the difference between a maximum and a minimum of the elasticity term E' of the magnetic recording medium 10 in a temperature range of 0° C. to 80° C. may be, for example, equal to or less than 1.5 GPa, preferably equal to or less than 0.9 GPa, and more preferably equal to or less than 0.5 GPa. As a result, influence of long-term preservation on reproduction can be further reduced.

The viscosity term E" and the elasticity term E' are measured by dynamic viscoelasticity measurement. The dynamic viscoelasticity measurement is temperature-dependent measurement and is specifically performed in the manner as follows.

The magnetic recording medium 10 is stamped by a stamper to form a sample having a length in the tape longitudinal direction of 22.0 mm and a width in the width direction of 4.0 mm. Both ends in the longitudinal direction of the sample are clamped at a measurement section of a dynamic viscoelasticity measuring instrument (RSA II, produced by TA Instruments). Then, dynamic viscoelasticity measurement is conducted under the following measurement conditions.

Measurement temperature range: −10° C. to 140° C.
Temperature rise rate: 2° C./min
Amplitude: Contraction and extension are conducted with amplitude of 0.1% based on tape initial length
Measurement frequency: 10 Hz
Test Type: "Strain-Controlled"
Measurement Type: "Dynamic"
Environment in which instrument is disposed: Temperature 25° C., humidity 50 RH %
Humidity control for measurement section: Absent More detailed settings concerning the measurement conditions of the instrument are as follows. As described below, in the measurement, tension is adjusted such that the tension does not become equal to or less than 0, and setting is adjusted such that strain does not become below a lower limit of a transducer. The measurement conditions for these adjustments may be set, as required, by those skilled in the art, and, for the above-mentioned dynamic viscoelasticity measuring instrument, for example, the following settings may be adopted.

Option Settings
  Delay Before Test: OFF
  Auto Tension (Settings for adjusting tension such that the tension does not become equal to or below 0)
Mode Static Force Tracking Dynamic Force
  Auto Tension Direction Tension
  Initial Static Force 10.0 g
  Static>Dynamic Force by 5.0%
  Minimum Static Force 1.0 g
  Auto Tension Sensitivity 1.0 g
Auto Strain (Settings Adjusted Such That Strain Does Not Become Below Lower Limit of Transducer)
  Max Applied Strain 0.1%
  Max Allowed Force 100.0 g
  Min allowed Force 2.0 g
  Strain Adjustment 3.0%
Meas Ops: Default setting By subjecting the magnetic recording medium 10 to the above-described dynamic viscoelasticity measurement, values of the viscosity term E" and the elasticity term E' at each measurement temperature are obtained. Then, a maximum and a minimum of the viscosity term E" in a temperature range of 0° C. to 80° C. are acquired, and the minimum is subtracted from the maximum, so that the difference between the maximum and the minimum of the viscosity term E" in the temperature range of 0° C. to 80° C. when the dynamic viscoelasticity measurement is conducted is obtained.

In addition, a maximum and a minimum of the viscosity term E" in a temperature range of 40° C. to 80° C. are acquired, and the minimum is subtracted from the maximum, so that the difference between the maximum and the minimum of the viscosity term E" in the temperature range of 40° C. to 80° C. when the dynamic viscoelasticity measurement is performed is obtained.

Besides, a maximum and a minimum of the elasticity term E' in a temperature range of 0° C. to 80° C. are acquired, and the minimum is subtracted from the maximum, so that the difference between the maximum and the minimum of the elasticity term E' in the temperature range of 0° C. to 80° C. when the dynamic viscoelasticity measurement is conducted is obtained.

In addition, as above-mentioned, by the dynamic viscoelasticity measurement, the value of the viscosity term E" at each measurement temperature is obtained. By plotting these values against measurement temperature, the tendency of variation in the viscosity term E" attendant on the temperature variation can be read. For example, from the graph obtained by the plotting, it is possible to know whether or not the tendency of variation as described in the above "1. Description of the present technology" is present.

The viscosity term E" and the elasticity term E' of the magnetic recording medium 10 can be adjusted, for example, by modifying the kind of the material for forming the base layer and/or the compositions of the magnetic layer, the ground layer, and the back layer (particularly, the ground layer which is often the thickest of these three layers) and their combination.

For example, by using PEN, PET, or PEEK as the material for forming the base layer, the viscosity term E" and the elasticity term E' can be adjusted, and, for example, the differences between the maximum and the minimum of each of the viscosity term E" and the elasticity term E' in the temperature range of 0° C. to 80° C. can be brought into the above-mentioned numerical value ranges. In addition, by the selection of these resins, the shape of the graph obtained by plotting the viscosity term E" against temperature variation can be modified.

In addition, for example, by modifying the kinds of the resin components contained in the coating materials for forming the magnetic layer, the ground layer, and the back layer (particularly, the ground layer) and/or adjusting the resin compositions, the viscosity term E" and the elasticity term E' can be adjusted, and, for example, the differences between the maximum and the minimum of each of the viscosity term E" and the elasticity term E' in the temperature range of 0° C. to 80° C. can be brought into the above-mentioned numerical value ranges. For example, by adjusting the glass transition temperatures Tg of the binders which may be contained in these layers, the viscosity term E" and the elasticity term E' can be adjusted, and, for example, the differences can be brought into the above-mentioned numerical value ranges. From the viewpoint of ease of adjustment of the glass transition temperature Tg, the binder includes, for example, a polyurethane resin. More preferably, the ground layer includes a polyurethane resin, so that adjustment of the viscosity term E" and the elasticity term E' is facilitated. Further preferably, the glass transition temperature Tg of the polyurethane resin included in the ground layer is preferably 10° C. to 140° C., more preferably 30° C. to 130° C., further preferably 30° C. to 120° C., and still further preferably 55° C. to 120° C. In the case where the glass transition temperature Tg is too low, sticking can be generated during preservation at high temperature. In the case where the glass transition temperature Tg is too high, the treatment in surface smoothing (calendering) can become difficult to carry out.

(Squareness Ratio S2 Measured in Perpendicular Direction)

The squareness ratio S2 measured in the perpendicular direction (thickness direction) of the magnetic recording medium 10 is preferably equal to or more than 65%, more preferably equal to or more than 70%, further preferably equal to or more than 73%, and still further preferably equal to or more than 80%. When the squareness ratio S2 is equal to or more than 65%, perpendicular orientability of the magnetic powder is sufficiently high, so that a better SNR can be obtained. Therefore, more excellent electromagnetic conversion characteristics can be obtained. In addition, servo signal shape is improved, and control on the driving side is facilitated.

That the magnetic recording medium is perpendicularly oriented herein may mean that the squareness ratio S2 of the magnetic recording medium is within the above-mentioned numerical value range (for example, equal to or more than 65%).

The squareness ratio S2 in the perpendicular direction is determined in the manner as follows. First, three magnetic recording media 10 are laminated by use of a double-faced adhesive tape, and the laminate is punched by a φ6.39 mm punch to produce a measurement sample. In this instance, for the longitudinal direction (traveling direction) of the magnetic recording medium 10 to be recognizable, marking with any nonmagnetic ink is conducted. Then, using a VSM, an M-H loop of the measurement sample (the whole of the magnetic recording medium 10) corresponding to the perpendicular direction (thickness direction) of the magnetic recording medium 10 is measured. Next, using acetone or ethanol or the like, the coating films (the ground layer 12, the magnetic layer 13, the back layer 14, and the like) are removed, leaving the base layer 11 alone. Then, three base layers 11 thus obtained are laminated by use of a double-faced adhesive tape, and the laminate is punched by a φ6.39 mm punch to obtain a background correction sample (hereinafter referred to simply as "correction sample"). Thereafter, using a VSM, an M-H loop of the correction sample (the base layer 11) corresponding to the perpendicular direction of the base layer 11 (the perpendicular direction of the magnetic recording medium 10) is measured.

In the measurement of the M-H loop of the measurement sample (the whole of the magnetic recording medium 10) and the M-H loop of the correction sample (the base layer 11), a high sensitivity vibrating sample magnetometer "VSM-P7-15 model" produced by Toei Industry Co., Ltd. is used. The measurement conditions are a measurement mode: full loop, a maximum magnetic field: 15 kOe, a magnetic field step: 40 bit, a Time constant of Locking amp: 0.3 sec, a Waiting time: 1 sec, and an MH average number: 20.

After the M-H loop of the measurement sample (the whole of the magnetic recording medium 10) and the M-H loop of the correction sample (the base layer 11) are obtained, the M-H loop of the correction sample (the base layer 11) is subtracted from the M-H loop of the measurement sample (the whole of the magnetic recording medium 10), so that background correction is performed, and the M-H loop after the background correction is obtained. For the calculation of the background correction, a measurement/analysis program attached to "VSM-P7-15 model" is used.

A saturation magnetization Ms (emu) and a residual magnetization Mr (emu) of the M-H loop after the background correction thus obtained are put into the following formula to calculate the squareness ratio S2 (%). Note that both of the measurements of the M-H loops are carried out at 25° C. In addition, "diamagnetic field correction" at the time of measuring the M-H loop in the perpendicular direction of the magnetic recording medium 10 is not performed. Note that, for this calculation, the measurement/analysis program attached to "VSM-P7-15 model" is used.

Squareness ratio $S2(\%)=(Mr/Ms)\times 100$ (Squareness Ratio S1 Measured in Longitudinal Direction)

The squareness ratio S1 measured in the longitudinal direction (traveling direction) of the magnetic recording medium 10 is preferably equal to or less than 35%, more preferably equal to or less than 30%, equal to or less than 27%, equal to or less than 25%, and further preferably equal to or less than 20%. When the squareness ratio S1 is equal to or less than 35%, perpendicular orientability of the magnetic powder is sufficiently high, so that a better SNR can be obtained. Therefore, more excellent electromagnetic conversion characteristics can be obtained. In addition, servo signal shape is improved, and control on the driving side is facilitated.

That the magnetic recording medium is perpendicularly oriented herein may mean that the squareness ratio S1 of the magnetic recording medium is within the above-mentioned numerical value range (for example, equal to or less than 35%). The magnetic recording medium according to the present technology is preferably perpendicularly oriented.

The squareness ratio S1 in the longitudinal direction is determined similarly to the squareness ratio S2, except that the M-H loop is measured in the longitudinal direction (traveling direction) of the magnetic recording medium 10 and the base layer 11.

The squareness ratios S1 and S2 are set to desired values by adjusting, for example, the intensity of a magnetic field applied to the magnetic layer forming coating material, application time of the magnetic field to the magnetic layer forming coating material, the dispersed state of the magnetic powder in the magnetic layer forming coating material, and the concentration of solid matter in the magnetic layer forming coating material. Specifically, for example, as the intensity of the magnetic field is set stronger, the squareness ratio S1 is reduced whereas the squareness ratio S2 is enhanced. In addition, as the application time of the magnetic field is set longer, the squareness ratio S1 is reduced whereas the squareness ratio S2 is enhanced. Besides, as the dispersed state of the magnetic powder is enhanced, the squareness ratio S1 is reduced whereas the squareness ratio S2 is enhanced. In addition, as the concentration of the solid matter is set lower, the squareness ratio S1 is reduced whereas the squareness ratio S2 is enhanced. Note that the above-mentioned adjusting methods may be used singly, or two or more of them may be used in combination.

(Arithmetic Mean Roughness $R_a$)

The arithmetic mean roughness $R_a$ of the magnetic layer side surface (hereinafter referred to also as "magnetic surface") of the magnetic recording medium 10 is preferably equal to or less than 2.5 nm, and more preferably equal to or less than 2.0 nm. When $R_a$ is equal to or less than 2.5 nm, a better SNR can be obtained.

The arithmetic mean roughness $R_a$ is determined in the manner as follows. First, the surface of the magnetic layer 13 is observed by an AFM to obtain a 40×40 μm AFM image. As the AFM, Dimension 3100 produced by Digital Instruments, Inc. and its analysis software are used, as a cantilever, one including silicon single crystal is used (Note 1), and as a tapping frequency, measurement with a tuning of 200 to 400 Hz is conducted. Next, the AFM image is divided into 512×512 (=262,144) measurement points, height Z(i) (i is measurement point number; i=1 to 262,144) is measured at each measurement point, and the heights Z(i) at the measurement points are simply averaged (arithmetic mean) to obtain an average height (average surface) $Z_{ave}$ $(=(Z(1)+Z(2)+ \ldots +Z(262,144))/262,144)$. Subsequently, deviation $Z"(i)$ $(=|Z(i)-Z_{ave}|)$ from an average center line at each measurement point is determined, and arithmetic mean roughness $R_a$ [nm] $(=(Z"(1)+Z"(2)+ \ldots +Z"(262,144))/262,144)$ is calculated. In this instance, data obtained by a filtering treatment by Flatten order 2 and planefit order 3 XY as image processing is used as data.

(Note 1) Produced by NanoWorld AG SPM probe NCH normal type PointProbe L (cantilever length)=125 μm (Coercive Force Hc)

The coercive force Hc of the magnetic recording medium 10 in the longitudinal direction is preferably equal to or less than 2,000 Oe, more preferably equal to or less than 1,900 Oe, and further preferably equal to or less than 1,800 Oe. When the coercive force Hc in the longitudinal direction is equal to or less than 2,000 Oe, magnetization reacts with good sensitivity by a magnetic field in the perpendicular direction from the recording head, so that a good record pattern can be formed.

The coercive force Hc measured in the longitudinal direction of the magnetic recording medium 10 is preferably equal to or more than 1,000 Oe. When the coercive force Hc in the longitudinal direction is equal to or more than 1,000 Oe, demagnetization due to leakage flux from the recording head can be restrained.

The coercive force Hc is determined in the manner as follows. First, three magnetic recording media 10 are laminated by use of a double-faced adhesive tape, and the laminate is punched by a φ6.39 mm punch to produce a measurement sample. In this instance, in order that the longitudinal direction (traveling direction) of the magnetic recording medium 10 can be recognized, marking with any nonmagnetic ink is conducted. Then, using a VSM (Vibrating Sample Magnetometer), an M-H loop of the measurement sample (the whole of the magnetic recording medium 10) corresponding to the longitudinal direction (traveling direction) of the magnetic recording medium 10 is measured. Next, the coating films (the ground layer 12, the magnetic layer 13, the back layer 14, and the like) are removed by use of acetone, ethanol, or the like, leaving the base layer 11 alone. Three base layers 11 thus obtained are laminated by use of a double-faced adhesive tape, and the laminate is punched by a φ6.39 mm punch to produce a background correction sample (hereinafter referred to simply as "correction sample"). Thereafter, using a VSM, an M-H loop of the correction sample (the base layer 11) corresponding to the perpendicular direction of the base layer 11 (the perpendicular direction of the magnetic recording medium 10) is measured.

In the measurement of the M-H loop of the measurement sample (the whole of the magnetic recording medium 10) and the M-H loop of the correction sample (the base layer 11), a high sensitivity vibrating sample magnetometer "VSM-P7-15 model" produced by Toei Industry Co., Ltd. is used. The measurement conditions are a measurement mode: full loop, a maximum magnetic field: 15 kOe, a magnetic field step: 40 bit, a Time constant of Locking amp: 0.3 sec, a Waiting time: 1 sec, and an MH average number: 20.

After the M-H loop of the measurement sample (the whole of the magnetic recording medium 10) and the M-H loop of the correction sample (the base layer 11) are obtained, the M-H loop of the correction sample (the base layer 11) is subtracted from the M-H loop of the measurement sample (the whole of the magnetic recording medium 10), so that background correction is performed, and the M-H loop after the background correction is obtained. For the calculation of the background correction, a measurement/analysis program attached to "VSM-P7-15 model" is used.

The coercive force Hc is determined from the M-H loop after the background correction thus obtained. Note that for this calculation, the measurement/analysis program attached to "VSM-P7-15 model" is used. Note that the measurements of the M-H loops are both conducted at 25° C. In addition, "diamagnetic field correction" at the time of measuring the M-H loop in the longitudinal direction of the magnetic recording medium 10 is not performed.

(4) Manufacturing Method for Magnetic Recording Medium

Next, a manufacturing method for the magnetic recording medium 10 having the aforementioned configuration will be described below. First, a ground layer forming coating material is prepared by kneading and/or dispersing a nonmagnetic powder, a binder, and the like in a solvent. Subsequently, a magnetic layer forming coating material is prepared by kneading and/or dispersing a magnetic powder, a binder, and the like in a solvent. Next, a back layer forming coating material is prepared by kneading and/or dispersing a binder, a nonmagnetic powder, and the like in a solvent. For the preparation of the magnetic layer forming coating material, the ground layer forming coating material, the back layer forming coating material, for example, the following solvent, dispersing device, and kneading device can be used.

Examples of the solvent to be used for preparation of the aforementioned coating materials include: ketone solvents such as acetone, methyl ethyl ketone, methyl isobutyl ketone, and cyclohexanone; alcohol solvents such as methanol, ethanol, and propanol; ester solvents such as methyl acetate, ethyl acetate, butyl acetate, propyl acetate, ethyl lactate, and ethylene glycol acetate; ether solvents such as diethylene glycol dimethyl ether, 2-ethoxyethanol, tetrahydrofuran, and dioxane; aromatic hydrocarbon solvents such as benzene, toluene, and xylene; and halogenated hydrocarbon solvents such as methylene chloride, ethylene chloride, carbon tetrachloride, chloroform, and chlorobenzene. One of these may be used, or a mixture of two or more of these may be used.

Examples of the kneading device for use in preparation of the above-mentioned coating materials include kneading devices such as a continuous twin screw kneader, a continuous twin screw kneader capable of multi-stage dilution, a kneader, a pressure kneader, and a roll kneader, but these are not limitative. In addition, examples of the dispersing device for use in preparation of the aforementioned coating materials include a roll mill, a ball mill, a horizontal type sand mill, a vertical type sand mill, a spike mill, a pin mill, a tower mill, a pearl mill (for example, "DCP mill" produced by Eirich), homogenizer, and an ultrasonic dispersing device, but these are not limitative.

Next, the ground layer forming coating material is applied to a main surface on one side of the base layer 11, and is dried, to form the ground layer 12. Subsequently, the magnetic layer forming coating material is applied to the ground layer 12, and is dried, to form the magnetic layer 13 on the ground layer 12. Note that at the time of drying, the magnetic powder is subjected to magnetic field orientation in the thickness direction of the base layer 11 by use of a solenoid coil, for example. In addition, at the time of drying, the magnetic powder may be subjected to magnetic field orientation in the longitudinal direction (traveling direction) of the base layer 11 by use of a solenoid coil, and thereafter may be subjected to magnetic field orientation in the thickness direction of the base layer 11. By such a magnetic field orientation treatment, the perpendicular orientability (in other words, the squareness ratio S1) of the magnetic powder can be enhanced. After the formation of the magnetic layer 13, a back layer forming coating material is applied to a main surface on the other side of the base layer 11, and is dried to form the back layer 14. As a result, the magnetic recording medium 10 is obtained.

The squareness ratios S1 and S2 can be set to desired values, for example, by adjusting the intensity of a magnetic field applied to the coating film of the magnetic layer forming coating material, adjusting the concentration of solid matter in the magnetic layer forming coating material, or adjusting the drying conditions (for example, a drying temperature and a drying time) of the coating film of the magnetic layer forming coating material. The intensity of the magnetic field applied to the coating film is preferably two to three times the coercive force of the magnetic powder. For further enhancing the squareness ratio S1 (in other words, for further lowering the squareness ratio S2), it is preferable to enhance the dispersed state of the magnetic powder in the magnetic layer forming coating material. In addition, for further enhancing the squareness ratio S1, it is also effective to preliminarily magnetize the magnetic powder, at a stage before the magnetic layer forming coating material is put into an orientating apparatus for magnetic field orientation of the magnetic powder. Note that the adjusting methods for the squareness ratios S1 and S2 may be used singly, or two or more of them may be used in combination.

Thereafter, the magnetic recording medium 10 obtained as above is subjected to a calendering treatment, to smoothen the surface of the magnetic layer 13. Next, the magnetic recording medium 10 subjected to the calendering treatment is taken up in a roll form, after which the magnetic recording medium 10 is subjected to a heating treatment as it is, so that the multiplicity of projected portions 14A in the surface of the back layer 14 are transferred to the surface of the magnetic layer 13. As a result, micropores (a multiplicity of pore portions 13A) are formed in the surface of the magnetic layer 13.

The temperature of the heating treatment is preferably 55° C. to 75° C. When the temperature in this numerical value range is adopted as a temperature of the heating treatment, the shape of the projected portions is favorably transferred to the magnetic layer 13. In the case where the temperature of the heating treatment is too low (for example, less than 55° C.), the shape of the projected portions may not be transferred sufficiently. In the case where the temperature of the heating treatment is too high (for example, more than 75° C.), the amount of micropores may become too large, and an excessive amount of the lubricant may be present at the surface of the magnetic layer 13. Here, the temperature of the heating treatment is the temperature of an atmosphere in which the magnetic recording medium 10 is held.

The time of the heating treatment is preferably 15 to 40 hours. With the time of the heating treatment set within this numerical value range, the shape of the projected portions is transferred favorably to the magnetic layer 13. In the case where the time of the heating treatment is too short (for example, less than 15 hours), the shape of the projected portions may not be transferred sufficiently. For restraining a lowering in productivity, the time of the heating treatment is desirably equal to or less than 40 hours, for example.

Finally, the magnetic recording medium 10 is cut to a predetermined width (for example, ½ inch width). As a result, the desired magnetic recording medium 10 is obtained. Servo patterns are recorded on the magnetic recording medium 10. The recording of the servo patterns may be conducted, for example, by use of a servo writer that is known in this technical field.

In the manufacturing method as described above, the multiplicity of projected portions 14A formed on the surface of the back layer 14 are transferred onto the surface of the magnetic layer 13, so that the micropores are formed in the surface of the magnetic layer 13, but the micropore forming method is not limited to this. For example, the micropores may be formed in the surface of the magnetic layer 13, by adjusting the kind of the solvent contained in the magnetic layer forming coating material and/or adjusting the drying conditions for the magnetic layer forming coating material. In addition, for example, in the process of drying of the solvent contained in the magnetic layer forming coating material, the micropores can be formed by localization of the solid matter and the solvent contained in the magnetic layer forming coating material. Besides, in the process of applying the magnetic layer forming coating material, the solvent contained in the magnetic layer forming coating material can be also absorbed into the ground layer 12 through micropores in the ground layer 12 formed when the lower layer is applied and dried. The solvent may be moved from the ground layer 12 through the magnetic layer 13 in the drying step after the application, so that micropores providing communication between the magnetic layer 13 and the ground layer 12 may be formed.

(5) Recording and Reproduction Apparatus

[Configuration of Recording and Reproduction Apparatus]

Next, referring to FIG. 7, an example of the configuration of a recording and reproduction apparatus 30 for recording and reproduction with the magnetic recording medium 10 having the aforementioned configuration will be described below.

The recording and reproduction apparatus 30 has a configuration such that a tension exerted in the longitudinal direction of the magnetic recording medium 10 can be adjusted. In addition, the recording and reproduction apparatus 30 has a configuration such that a magnetic recording cartridge 10A can be mounted therein. Here, for easy description, a case where the recording and reproduction apparatus 30 has a configuration such that one magnetic recording cartridge 10A can be mounted therein is described, but the recording and reproduction apparatus 30 may have a configuration such that a plurality of magnetic recording cartridges 10A can be mounted therein.

The recording and reproduction apparatus 30 is connected to information processing apparatuses such as a server 41 and a personal computer (hereinafter referred to as "PC") 42 and the like by way of a network 43, and is configured such that data supplied from these information processing apparatuses can be recorded in the magnetic recording cartridge 10A. The shortest recording wavelength of the recording and reproduction apparatus 30 is preferably equal to or less than 100 nm, more preferably equal to or less than 75 nm, further preferably equal to or less than 60 nm, and particularly preferably equal to or less than 50 nm.

Figure 7:
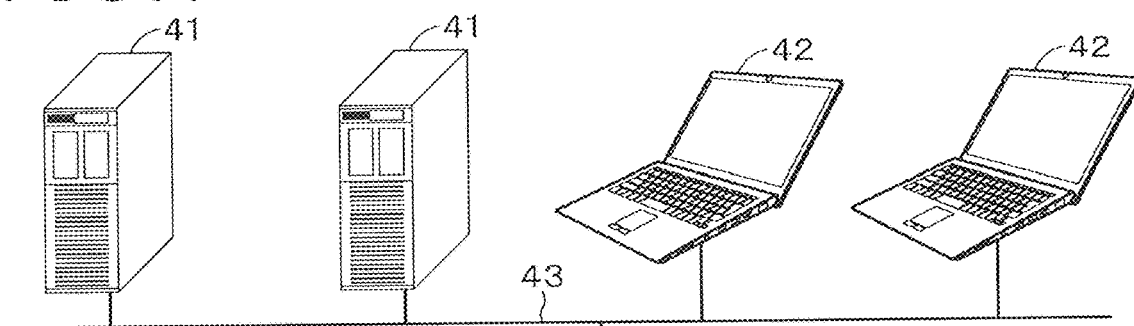
FIG. 7 is a schematic diagram depicting a configuration of a recording and reproduction apparatus.
Figure 7:
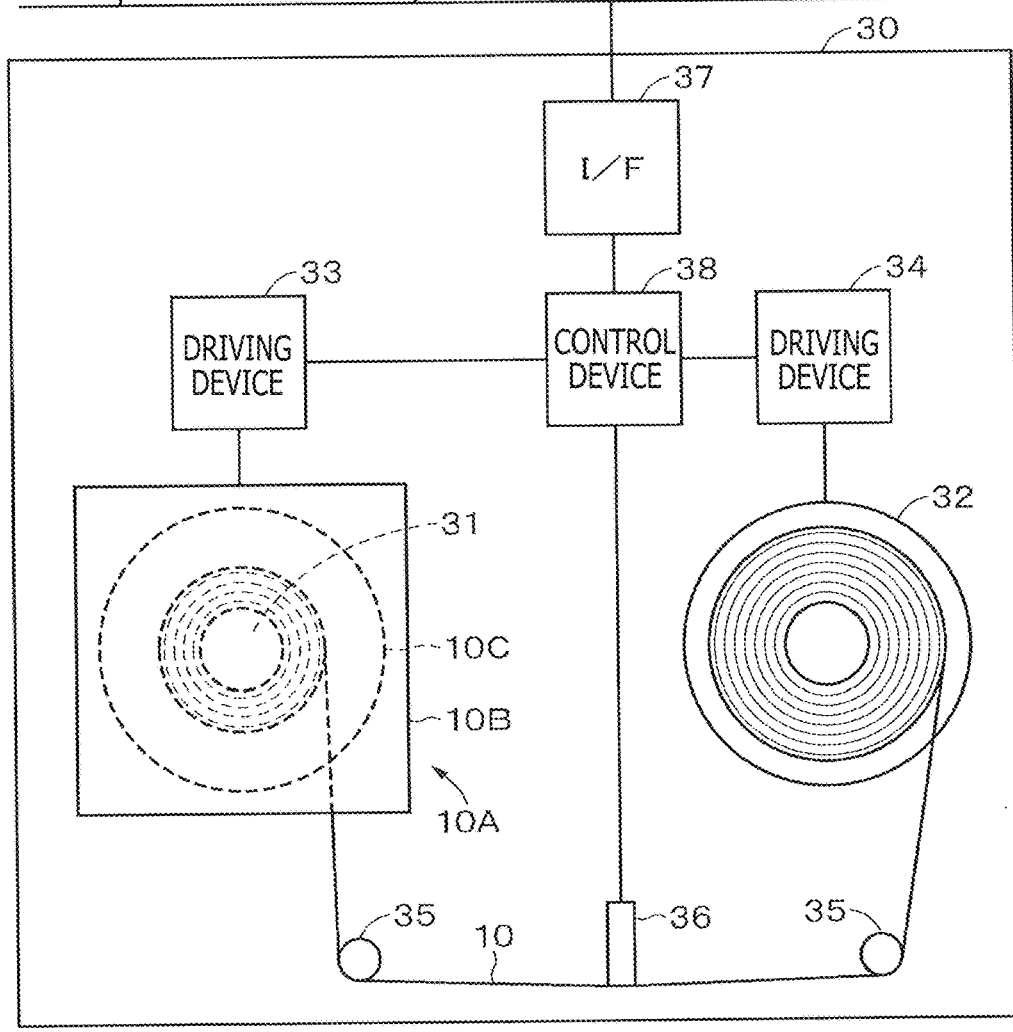

As illustrated in FIG. 7, the recording and reproduction apparatus 30 includes a spindle 31, a reel 32 on the recording and reproduction apparatus side, a spindle driving device 33, a reel driving device 34, a plurality of guide rollers 35, a head unit 36, a communication interface (hereinafter referred to as I/F) 37, and a control device 38.

The spindle 31 is configured such that the magnetic recording cartridge 10A can be mounted thereto. The magnetic recording cartridge 10A is in accordance with an LTO (Linear Tape Open) standard, in which a single reel 10C with the magnetic recording medium 10 wound therearound is rotatably accommodated in a cartridge case 10B. Servo patterns in the shape of inverted v are preliminarily recorded as servo signals on the magnetic recording medium 10. The reel 32 is configured such that a leading end of the magnetic recording medium 10 drawn out of the magnetic recording cartridge 10A can be fixed thereto.

The spindle driving device 33 is a device that rotationally drives the spindle 31. The reel driving device 34 is a device that rotationally drives the reel 32. At the time of recording or reproducing data on the magnetic recording medium 10, the spindle driving device 33 and the reel driving device 34 rotationally drive the spindle 31 and the reel 32, so that the magnetic recording medium 10 is made to travel. The guide rollers 35 are rollers for guiding the traveling of the magnetic recording medium 10.

The head unit 36 includes a plurality of recording heads for recording data signals on the magnetic recording medium 10, a plurality of reproducing heads for reproducing the data signals recorded on the magnetic recording medium 10, and a plurality of servo heads for reproducing servo signals recorded on the magnetic recording medium 10. For example, a ring-type head can be used as the recording head, but the kind of the recording head is not limited to this.

The communication I/F 37 is for performing communication with information processing apparatuses such as the server 41 and the PC 42, and is connected to the network 43.

The control device 38 controls the whole part of the recording and reproduction apparatus 30. For example, in response to a request from the information processing apparatus such as the server 41 and the PC 42, the control device 38 records data signals, supplied from the information processing apparatus, onto the magnetic recording medium 10 by the head unit 36. In addition, in response to a request from the information processing apparatus such as the server 41 and the PC 42, the control device 38 reproduces the data signal, recorded on the magnetic recording medium 10, by the head unit 36 and supplies the reproduced data signal to the information processing apparatus.

[Operation of Recording and Reproduction Apparatus]

Next, an operation of the recording and reproduction apparatus 30 having the above-mentioned configuration will be described below.

First, the magnetic recording cartridge 10A is mounted to the recording and reproduction apparatus 30, the leading end of the magnetic recording medium 10 is drawn out and sent through the plurality of guide rollers 35 and the head units 36 to the reel 32, and the leading end of the magnetic recording medium 10 is attached to the reel 32.

Next, when an operating section not illustrated is operated, the spindle driving device 33 and the reel driving device 34 are driven by the control of the control device 38, and the spindle 31 and the reel 32 are rotated in the same direction such that the magnetic recording medium 10 travels from the reel 10C toward the reel 32. As a result, recording of information onto the magnetic recording medium 10 or reproduction of information recorded on the magnetic recording medium 10 is conducted by the head unit 36, while the magnetic recording medium 10 is taken up onto the reel 32.

In addition, in the case of rewinding the magnetic recording medium 10 back onto the reel 10C, the spindle 31 and the reel 32 are rotationally driven in the reverse direction to the above-mentioned, so that the magnetic recording medium 10 is made to travel from the reel 32 to the reel 10C. At the time of this rewinding, also, recording of information onto the magnetic recording medium 10 or reproduction of information recorded on the magnetic recording medium 10 is performed by the head unit 36.

(6) Cartridge

[Configuration of Cartridge]

The present technology also provides a magnetic recording cartridge (referred to also as tape cartridge) including the magnetic recording medium according to the present technology. In the magnetic recording cartridge, the magnetic recording medium may be wound around a reel, for example. The magnetic recording cartridge may include, for example, a communication section that performs communication with the recording and reproduction apparatus, a storage section, and a control section that stores information received from the recording and reproduction apparatus through the communication section into the storage section and, in response to a request from the recording and reproduction apparatus, reads out information from the storage section to transmit the information to the recording and reproduction apparatus through the communication section. The information can include adjustment information for adjusting a tension exerted in the longitudinal direction of the magnetic recording medium.

Figure 10:
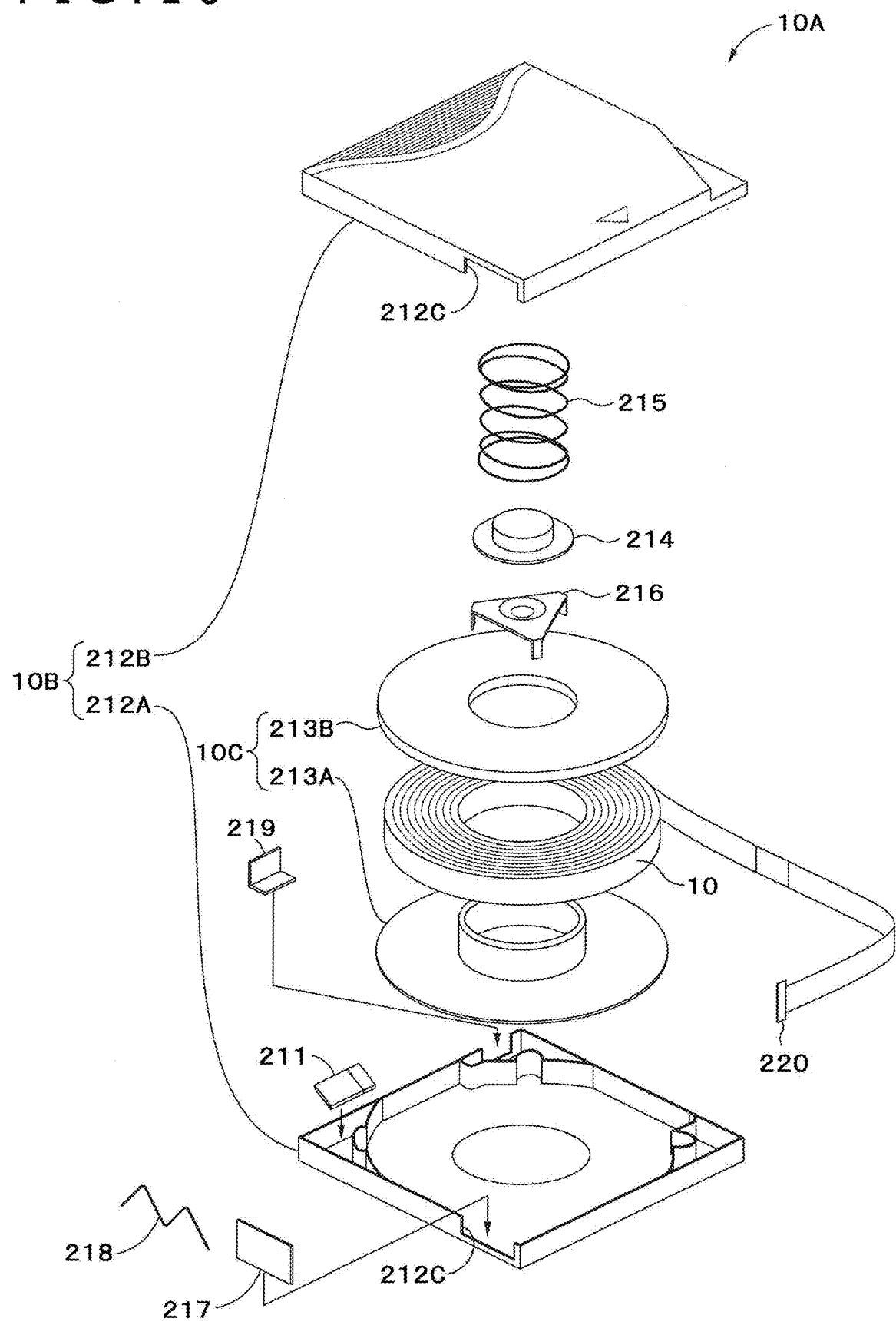
FIG. 10 is an exploded perspective view depicting an example of a configuration of a cartridge.

Referring to FIG. 10, an example of the configuration of the cartridge 10A including the magnetic recording medium 10 having the aforementioned configuration will be described.

FIG. 10 is an exploded perspective view depicting an example of the configuration of the cartridge 10A. The cartridge 10A is a magnetic recording cartridge based on an LTO (Linear Tape-Open) standard. The cartridge 10A includes, inside a cartridge case 10B including a lower shell 212A and an upper shell 212B, a reel 10C with a magnetic tape (tape-shaped magnetic recording medium) 10 wound therearound, a reel lock 214 and a reel spring 215 for locking rotation of the reel 10C, a spider 216 for releasing the locked state of the reel 10C, a slide door 217 for opening and closing a tape draw-out port 212C provided in the cartridge case 10B ranging over the lower shell 212A and the upper shell 212B, a door spring 218 for biasing the slide door 217 to a closed position of the tape draw-out port 212C, a write protect 219 for preventing erroneous erasure, and a cartridge memory 211. The reel 10C has a substantially disk-like shape having an opening in a central portion thereof and includes a reel hub 213A and a flange 213B including a rigid material such as a plastic. A leader pin 220 is provided at one end portion of the magnetic tape 10.

The cartridge memory 211 is provided in the vicinity of one corner part of the cartridge 10A. In a state in which the cartridge 10A is loaded in the recording and reproduction apparatus 30, the cartridge memory 211 faces a reader-writer (not illustrated) of the recording and reproduction apparatus 30. The cartridge memory 211 performs communication with the recording and reproduction apparatus 30, specifically, the reader-writer (not illustrated), by wireless communication standard based on the LTO standard.

[Configuration of Cartridge Memory]

Figure 11:
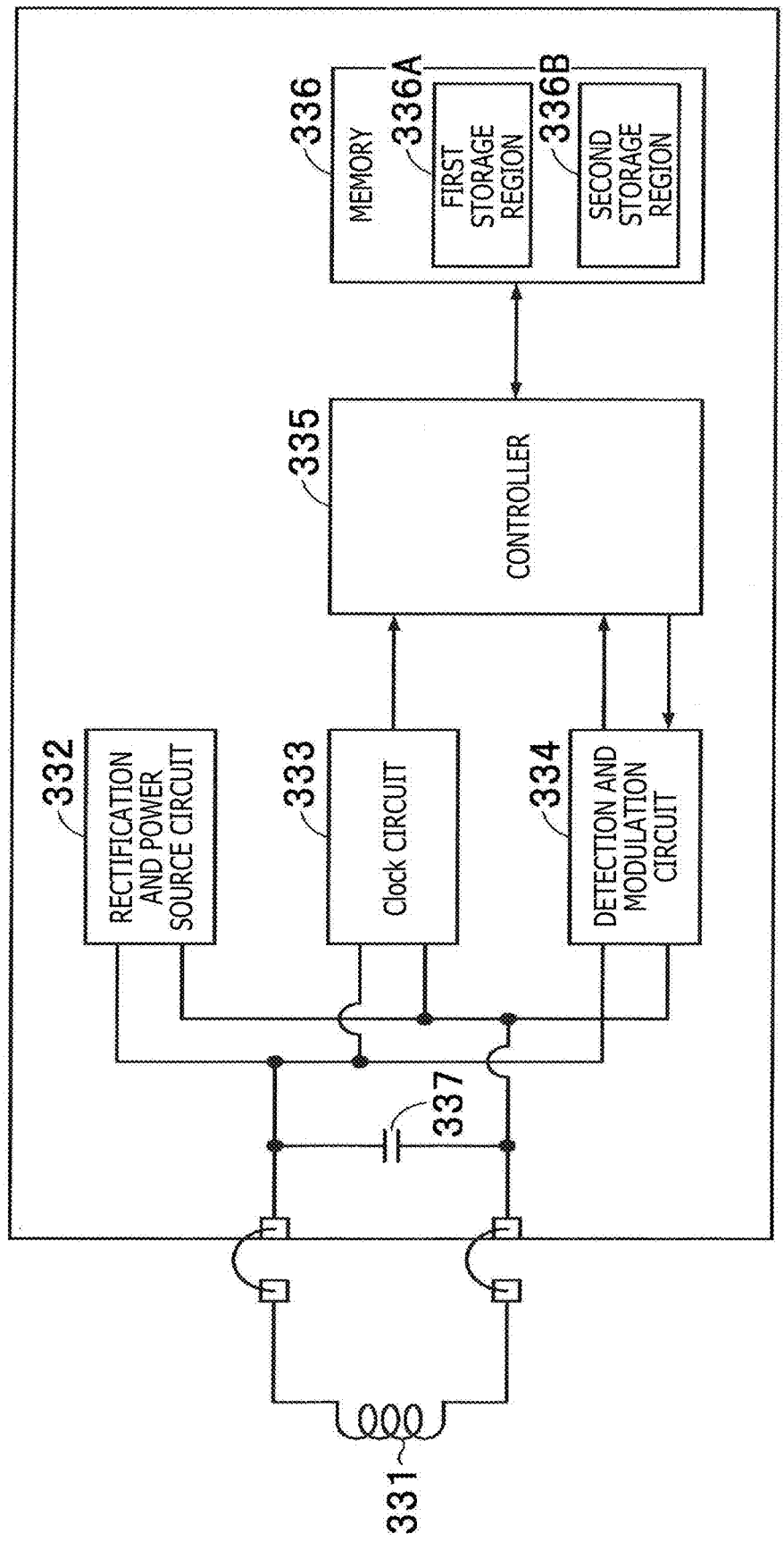
FIG. 11 is a block diagram depicting an example of a configuration of a cartridge memory.

Referring to FIG. 11, an example of the configuration of the cartridge memory 211 will be described.

FIG. 11 is a block diagram depicting an example of the configuration of the cartridge memory 211. The cartridge memory 211 includes: an antenna coil (communication section) 331 for performing communication with a reader-writer (not illustrated) according to a prescribed communication standard; a rectification and power source circuit 332 that generate electric power from an electric wave received by the antenna coil 331 by use of an induced electromotive force and rectifies the electric power to produce a power source; a clock circuit 333 that produces a clock from the electric wave received by the antenna coil 331 by use of an induced electromotive force; a detection and modulation circuit 334 that detects the electric wave received by the antenna coil 331 and modulates a signal to be transmitted by the antenna coil 331; a controller (control section) 335 including, for example, a logical circuit for discriminating a command and data from a digital signal extracted from the detection and modulation circuit 334 and processing the command and data; and a memory (storage section) 336 for storing information. In addition, the cartridge memory 211 includes a capacitor 337 connected in parallel to the antenna coil 331, and the antenna coil 331 and the capacitor 337 constitutes a resonance circuit.

The memory 336 stores information concerning the cartridge 10A and the like. The memory 336 is an NVM (Non Volatile Memory). The storage capacity of the memory 336 is preferably equal to or more than approximately 32 KB. For example, in the case where the cartridge 10A is based on an LTO format standard of the next or later generation, the memory 336 has a storage capacity of approximately 32 KB.

The memory 336 includes a first storage region 336A and a second storage region 336B. The first storage region 336A corresponds to a storage region of a cartridge memory based on LTO 8 or an LTO standard before LTO 8 (hereinafter referred to as "conventional cartridge memory"), and is a region for storing information based on LTO 8 or the LTO standard before LTO 8. The information based on LTO 8 or the LTO standard before LTO 8 includes, for example, manufacturing information (e.g., specific number of the cartridge 10A, etc.), use history (e.g., the number of times of tape draw-out (Thread Count), etc.), and the like.

The second storage region 336B corresponds to an extended storage region in regard of the storage region of the conventional cartridge memory. The second storage region 336B is a region for storage of additional information. Here, the additional information means that information concerning the cartridge 10A which is not specified in LTO 8 or the LTO standards before LTO 8. Examples of the additional information includes tension adjustment information, management ledger data, Index information, and thumb-nail information of a moving image stored in the magnetic tape 10, but these data are not limitative. The tension adjustment information includes the distance between adjacent servo bands (the distance between servo patterns recorded in adjacent servo bands) at the time of recording data onto the magnetic tape 10. The distance between the adjacent servo bands is an example of width-related information related to the width of the magnetic tape 10. The distance between the servo bands will be described in detail later. In the following description, the information stored in the first storage region 336A may be referred to as "first information," and the information stored in the second storage region 336B may be referred to as "second information."

The memory 336 may have a plurality of banks. In this case, some banks of the plurality of banks may constitute the first storage region 336A, and the remaining banks may constitute the second storage region 336B. Specifically, for example, in the case where the cartridge 10A is based on an LTO format standard of the next or later generation, the memory 336 may have two banks having a storage capacity of approximately 16 KB, one of the two banks may constitute the first storage region 336A, and the other bank may constitute the second storage region 336B.

The antenna coil 331 induces an induced voltage by electromagnetic induction. The controller 335 performs communication with the recording and reproduction apparatus 30 according to a prescribed communication standard, through the antenna coil 331. Specifically, the controller 335 performs, for example, mutual authentication, transmission and reception of commands, transfer of data, etc.

The controller 335 stores the information, received from the recording and reproduction apparatus 30 through the antenna coil 331, into the memory 336. In response to a request from the recording and reproduction apparatus 30, the controller 335 reads out information from the memory 336 and transmits the information to the recording and reproduction apparatus 30 through the antenna coil 331.

(7) Modification of Cartridge
[Configuration of Cartridge]

Figure 12:
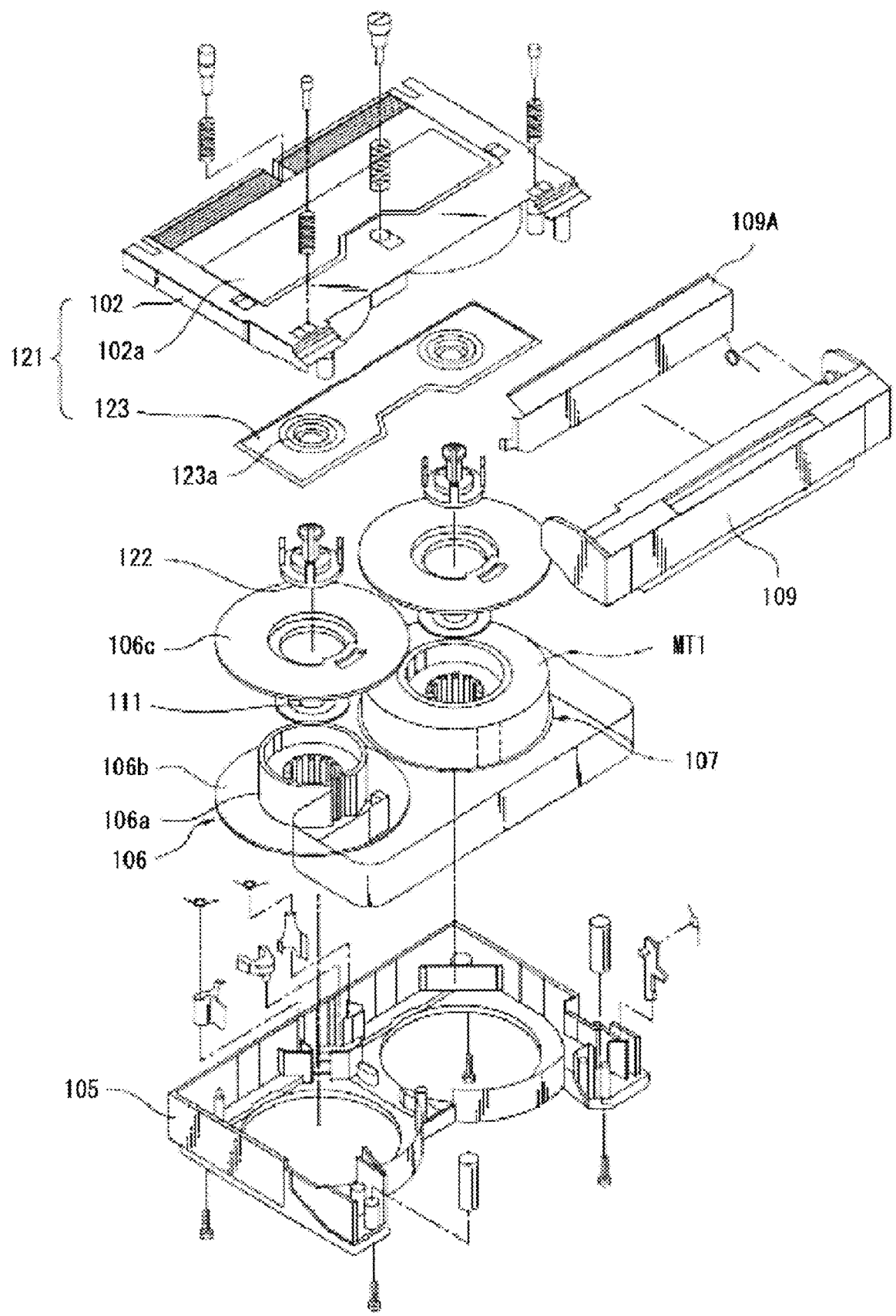
FIG. 12 is an exploded perspective view depicting an example of a configuration of a modification of the cartridge.

In the aforementioned embodiment, a case in which the magnetic tape cartridge is a single reel type cartridge has been described, but the magnetic tape cartridge may be a two reel type cartridge. In other words, the cartridge of the present technology may have one or a plurality of (for example, two) reels on which the magnetic tape is to be taken up. Referring to FIG. 12, an example of the magnetic recording cartridge of the present technology that has two reels will be described below.

FIG. 12 is an exploded perspective view depicting an example of the configuration of a two reel type cartridge 121. The cartridge 121 includes: an upper half 102 including a synthetic resin; a transparent window member 123 fitted and firmly attached to a window section 102a opened in an upper surface of the upper half 102; reel holders 122 firmly attached to the inside of the upper half 102 to prevent lifting-up of reels 106 and 107; a lower half 105 corresponding to the upper half 102; the reels 106 and 107 accommodated in a space formed by combining the upper half 102 and the lower half 105; a magnetic tape MT1 wound around the reels 106 and 107; a front lid 109 for closing a front-side opening formed by combining the upper half 102 and the lower half 105; and a back lid 109A for protecting the magnetic tape MT1 exposed at the front-side opening.

The reel 106 includes: a lower flange 106b provided in its central portion with a cylindrical hub section 106a around which the magnetic tape MT1 is wound; an upper flange 106c of substantially the same size as the lower flange 106b; and a reel plate 111 interposed between the hub section 106a and the upper flange 106c. The reel 107 has a configuration similar to that of the reel 106.

The window member 123 is provided at positions corresponding to the reels 106 and 107 with mounting holes 123a to which to mount the reel holders 122 as reel holding means for preventing lifting-up of the reels. The magnetic tape MT1 is similar to the magnetic tape T in the first embodiment.

(8) Effect

The magnetic recording medium 10 according to the present technology includes the magnetic layer 13, the ground layer 12, the base layer 11, and the back layer 14, in which the average thickness $t_T$ of the magnetic recording medium is equal to or less than 5.3 µm, and, when the magnetic recording medium is subjected to dynamic viscoelasticity measurement, the difference between a maximum and a minimum of viscosity term E" in a temperature range of 0° C. to 80° C. is equal to or less than 0.18 GPa. As a result, notwithstanding that the overall thickness of the magnetic recording medium 10 is as very small as equal to or less than 5.3 µm, good reproduction or recording can be performed even after long-term preservation. This is considered to be particularly owing to the fact that the difference is equal to or less than the above-mentioned upper limit.

(9) Modifications
[Modification 1]

Figure 8:
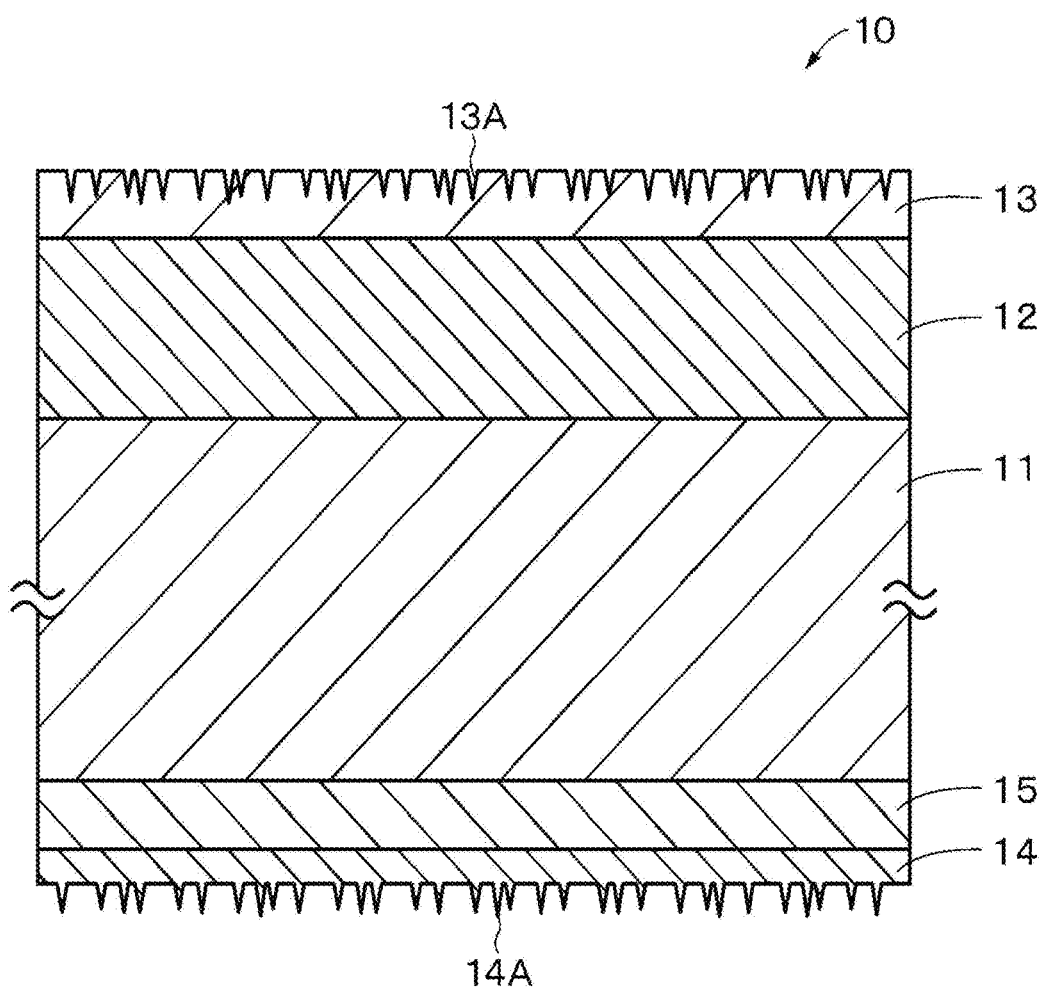
FIG. 8 is a schematic sectional view of a magnetic recording medium of a modification.

The magnetic recording medium 10 may further include a barrier layer 15 provided on a surface on at least one side of the base layer 11, as depicted in FIG. 8. The barrier layer 15 is a layer for restraining dimensional variations of the base layer 11 according to the environment. For example, an example of the cause of the dimensional variations is hygroscopicity of the base layer 11, and the rate of penetration of moisture into the base layer 11 can be reduced by the barrier layer 15. The barrier layer 15 contains a metal or a metallic oxide. As the metal, there may be used, for example, at least one of Al, Cu, Co, Mg, Si, Ti, V, Cr, Mn, Fe, Ni, Zn, Ga, Ge, Y, Zr, Mo, Ru, Pd, Ag, Ba, Pt, Au, or Ta. As the metallic oxide, there may be used, for example, at least one of $Al_2O_3$, CuO, CoO, $SiO_2$, $Cr_2O_3$, $TiO_2$, $Ta_2O_5$, or $ZrO_2$, and any of the oxides of the above-mentioned metals may also be used. In addition, DLC (Diamond-Like Carbon), diamond, or the like may also be used.

The average thickness of the barrier layer 15 is preferably 20 to 1,000 nm, and more preferably 50 to 1,000 nm. The average thickness of the barrier layer 15 is determined similarly to the average thickness $t_m$ of the magnetic layer 13. It is to be noted, however, that the magnification of the TEM image is adjusted, as required, according to the thickness of the barrier layer 15.

[Modification 2]

The magnetic recording medium 10 may be incorporated in a library apparatus. In other words, the present technology also provides a library apparatus including at least one magnetic recording medium 10. The library apparatus has a configuration such that tension exerted on the longitudinal direction of the magnetic recording medium 10 can be adjusted, and may include a plurality of the above-described recording and reproduction apparatuses 30.

3. EXAMPLES

The present technology will be described specifically below by way of Examples, but the present technology is not limited only to these examples.

In Examples and Comparative Examples below, the difference between a maximum and a minimum of viscosity term E" in a temperature range of 0° C. to 80° C. when dynamic viscoelasticity measurement was conducted, the difference between a maximum and a minimum of viscosity term E" in a temperature range of 40° C. to 80° C. when the measurement was conducted, the recording track width, the overall tape thickness, and the base layer thickness are values obtained by the measuring method described in "2. Embodiments of the present technology (example of coating-type magnetic recording medium)" above.

(1) Production of Magnetic Tape

As described below, magnetic tapes of Examples 1 to 14 and Comparative Examples 1 and 2 were produced. Table 1 below sets forth the difference between a maximum and a minimum of viscosity term E" in a temperature range of 0° C. to 80° C. when dynamic viscoelasticity measurement was conducted, the difference between a maximum and a minimum of viscosity term E" in a temperature range of 40° C. to 80° C. when the measurement was conducted, the recording track width, the overall tape thickness, and the base layer thickness, of these magnetic tapes.

Example 1

(Preparing Step of Magnetic Layer Forming Coating Material)

A magnetic layer forming coating material was prepared in the manner as follows. First, a first composition and a second composition of the following formulations were prepared by a dispersing treatment.

(First Composition)

Powder of barium ferrite ($BaFe_{12}O_{19}$) particles: 100 parts by mass (hexagonal plate-shaped, average aspect ratio 2.8, average particle volume 1,950 nm$^3$)

Cyclohexanone solution of vinyl chloride resin: 60 parts by mass (The composition of the solution is 30 mass % of the resin component and 70 mass % of cyclohexanone. Details of the vinyl chloride resin are: polymerization degree 300, Mn=10,000, $OSO_3K$=0.07 mmol/g as polar group, and secondary OH=0.3 mmol/g contained)

Aluminum oxide powder: 5 parts by mass ($\alpha$-$Al_2O_3$, average particle diameter 0.2 μm)

(Second Composition)

Carbon black (tradename: Seast TA, produced by Tokai Carbon Co., Ltd.): 2 parts by mass Cyclohexanone solution of vinyl chloride resin: 3.7 parts by mass (The composition of the solution is 30 mass % of the resin component and 70 mass % of cyclohexanone.)

n-Butyl stearate: 2 parts by mass

Methyl ethyl ketone: 121.3 parts by mass

Toluene: 121.3 parts by mass

Cyclohexanone: 60.7 parts by mass

Next, the first composition and the second composition thus prepared were mixed and stirred. To the thus obtained mixture were added 4 parts by mass of polyisocyanate (tradename: Coronate L, produced by Nippon Polyurethane Industry Co., Ltd.) as a curing agent and 2 parts by mass of stearic acid.

(Preparing Step for Ground Layer Forming Coating Material)

A ground layer forming coating material was prepared in the manner as follows. First, a third composition of the following formulation was prepared by a dispersing treatment.

(Third Composition)

Acicular iron oxide powder: 100 parts by mass ($\alpha$-$Fe_2O_3$, average long-axis length 0.10 μm)

Carbon black: 20 parts by mass (average particle diameter 20 nm)

Vinyl chloride resin: 10 parts by mass

Polyurethane resin: 10 parts by mass (The glass transition temperature Tg of the polyurethane resin is 75° C.)

n-Butyl stearate: 2 parts by mass

Methyl ethyl ketone: 198.2 parts by mass

Toluene: 198.2 part by mass

Cyclohexanone: 68.6 parts by mass

To the thus obtained third composition were added 4 parts by mass of a curing agent (tradename: Coronate L, produced by Nippon Polyurethane Industry Co., Ltd.) and 2 parts by mass of myristic acid.

(Preparing Step for Back Layer Forming Coating Material)

A back layer forming coating material was prepared in the manner as follows. The following raw materials were mixed in a stirring tank provided with a disperser, and a filter treatment was conducted to prepare a back layer forming coating material.

Powder of small particle diameter carbon black (average particle diameter (D50) 20 nm): 90 parts by mass Powder of large particle diameter carbon black (average particle diameter (D50) 270 nm): 10 parts by mass Polyester polyurethane: 100 parts by mass (tradename: N-2304, produced by Tosoh Corporation)

Methyl ethyl ketone: 500 parts by mass

Toluene: 400 parts by mass

Cyclohexanone: 100 parts by mass (Application Step)

Using the magnetic layer forming coating material and the ground layer forming coating material prepared as aforementioned, a ground layer was formed in the following manner on a main surface on one side of an elongate polyethylene terephthalate film (hereinafter referred to as "PET film") having an average thickness of 4.0 μm and serving as a nonmagnetic support, such that the average thickness after drying and calendering would be 0.8 and a magnetic layer was formed in the following manner such that the average thickness after drying and calendering would be 80 nm. First, the ground layer forming coating material was applied to the main surface on one side of the PEN film, and was dried to form the ground layer. Next, the magnetic layer forming coating material was applied onto the ground layer, and was dried to form the magnetic layer. Note that at the time of drying the magnetic layer forming coating material, the magnetic powder was subjected to magnetic field orientation in the thickness direction of the film by use of a solenoid coil, in other words, the magnetic powder was perpendicularly oriented. The perpendicular orientation degree was 66%. Subsequently, the back layer forming coating material was applied to the main surface on the other side of the PEN film, and was dried to form a back layer having an average thickness of 0.3 μm. As a result, a magnetic tape was obtained.

(Calendering Step, Transfer Step)

Subsequently, a calendering treatment was conducted to smoothen the surface of the magnetic layer. Next, the thus obtained magnetic tape was wound in a roll form, and the magnetic tape in this state was subjected to a heating treatment at 60° C. for 10 hours. After the magnetic tape was rewound in a roll form such that an end portion located on the inner circumferential side is reversely located on the outer circumferential side, the magnetic tape in this state was again subjected to a heating treatment at 60° C. for 10 hours. As a result, the multiplicity of projected portions on the surface of the back layer were transferred to the surface of the magnetic layer, so that a multiplicity of hole portions were formed in the surface of the magnetic layer.

(Cutting Step)

The magnetic tape obtained as above was cut to a width of ½ inch (12.65 mm). As a result, a desired elongate magnetic tape (average thickness 5.2 μm) was obtained.

(Dynamic Viscoelasticity Measurement)

The magnetic tape was subjected to dynamic viscoelasticity measurement as described in "2. Embodiments of the present technology (example of coating-type magnetic recording medium)" above. The measurement conditions of the measurement and detailed settings of the apparatus used for the measurement were also as described in "2. Embodiments of the present technology (example of coating-type magnetic recording medium)" above.

Figure 13:
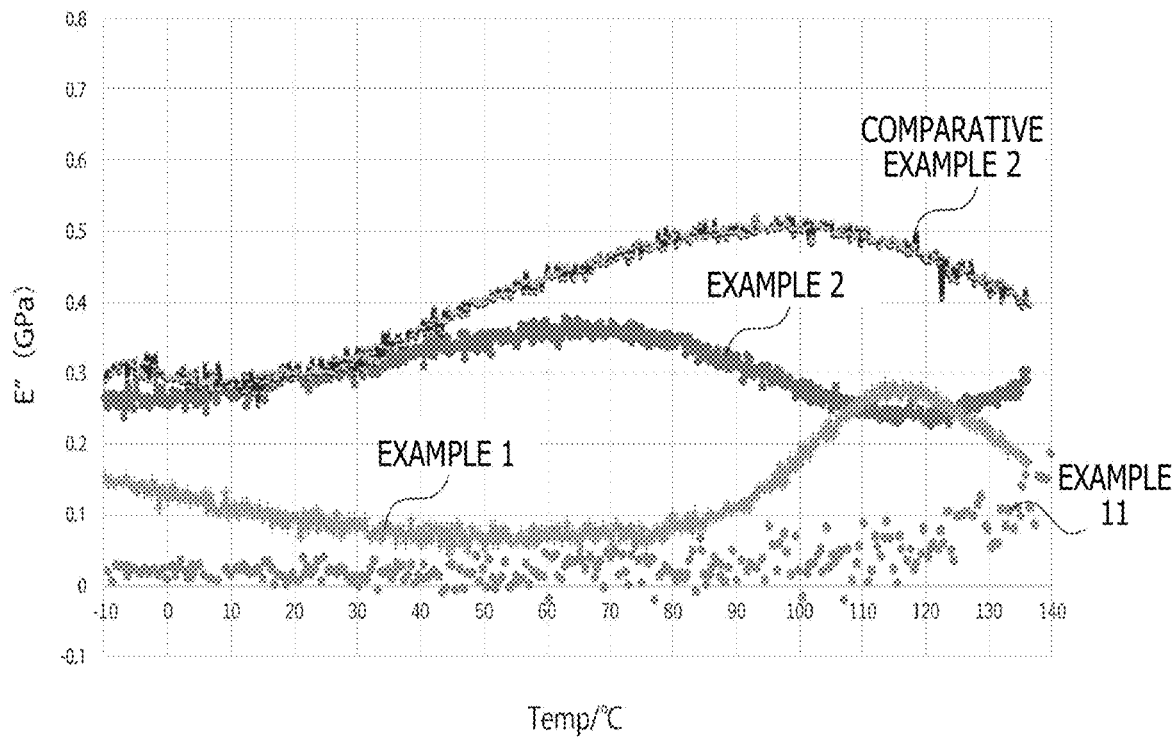
FIG. 13 is a graph obtained by plotting a viscosity term E" obtained by dynamic viscoelasticity measurement against temperature.

A graph of viscosity term E" obtained by the measurement plotted against temperature is depicted in FIG. 13. As illustrated in FIG. 13, the graph had a downwardly recessed shape.

In addition, as a result of the measurement, the difference between a maximum and a minimum of viscosity term E" in a temperature range of 0° C. to 80° C. was 0.10 GPa. Besides, the difference between a maximum and a minimum of viscosity term E" in a temperature range of 40° C. to 80° C. was 0.07 GPa. In addition, the temperature at which the minimum of the viscosity term E" of the magnetic recording medium was measured was within the range of 0° C. to 80° C.

Figure 14:
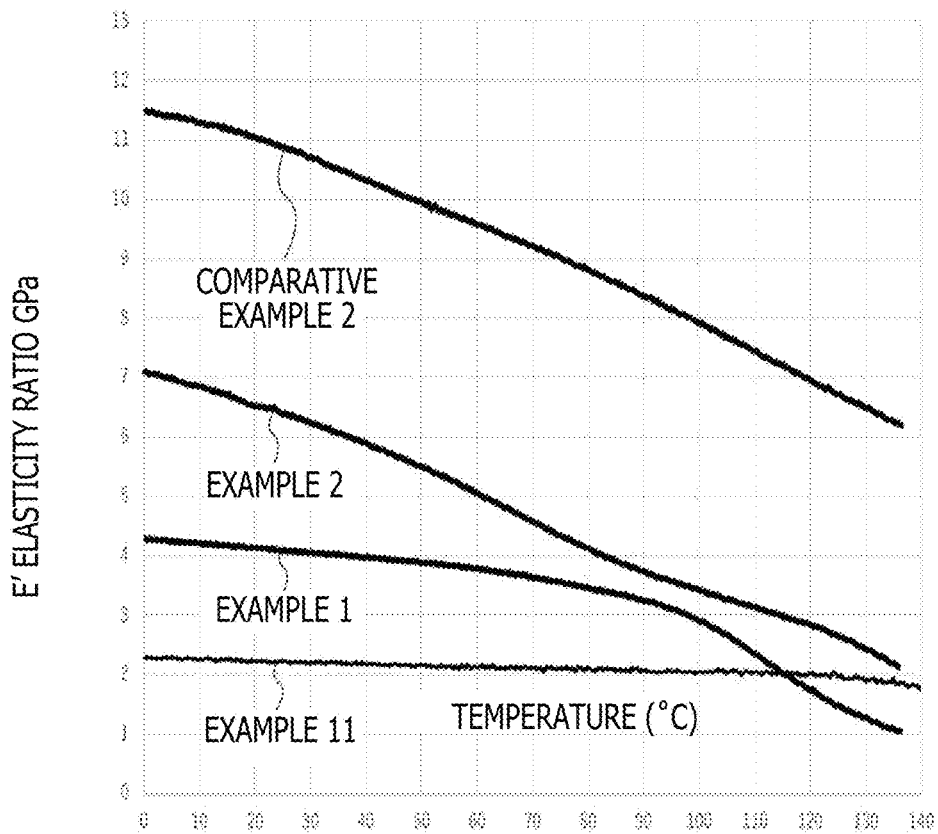
FIG. 14 is a graph obtained by plotting an elasticity term E' obtained by dynamic viscoelasticity measurement against temperature.

Besides, a graph of elasticity term E' obtained by the measurement plotted against temperature is depicted in FIG. 14. As a result of the measurement, the difference between a maximum and a minimum of elasticity term E' in a temperature range of 0° C. to 80° C. was 0.9 GPa.

Example 2

A magnetic tape was produced by the same method as in Example 1, except that a polyethylene naphthalate film (hereinafter referred to as "PEN film," average thickness 4.0 μm) was used in place of the PET film.

The magnetic tape was subjected to dynamic viscoelasticity measurement in the same manner as in Example 1. A graph of the viscosity term E" obtained by the measurement plotted against temperature is depicted in FIG. 13. As illustrated in FIG. 13, the graph had an upwardly protuberant shape. In addition, as a result of the measurement, the difference between a maximum and a minimum of viscosity term E" in a temperature range of 0° C. to 80° C. was 0.15 GPa. Besides, the difference between a maximum and a minimum of viscosity term E" in a temperature range of 40° C. to 80° C. was 0.07 GPa. In addition, the temperature at which the maximum of the viscosity term E" was measured was within the temperature range of 0° C. to 80° C.

Besides, a graph of elasticity term E' obtained by the measurement plotted against temperature is depicted in FIG. 14. As illustrated in FIG. 14, as a result of the measurement, the difference between a maximum and a minimum of elasticity term E' in a temperature range of 0° C. to 80° C. was 2.9 GPa.

Example 3

A magnetic tape was produced by the same method as in Example 2, except that a PEN film having an average thickness of 4.2 μm was used in place of the PEN film having an average thickness of 4.0 μm.

The magnetic tape was subjected to dynamic viscoelasticity measurement in the same manner as in Example 1. A graph of viscosity term E" obtained by the measurement plotted against temperature had an upwardly protuberant shape. In addition, as a result of the measurement, the difference between a maximum and a minimum of viscosity term E" in a temperature range of 0° C. to 80° C. was 0.17 GPa. Besides, the difference between a maximum and a minimum of the viscosity term E" in a temperature range of 40° C. to 80° C. was 0.07 GPa. In addition, the difference between a maximum and a minimum of elasticity term E' in a temperature range of 0° C. to 80° C. was 2.9 GPa.

Example 4

A magnetic tape was produced by the same method as in Example 2, except that a polyurethane resin having a glass transition temperature Tg of 100° C. was used in place of the polyurethane resin (Tg: 75° C.) contained in the ground layer forming coating material.

The magnetic tape was subjected to dynamic viscoelasticity measurement in the same manner as in Example 1. A graph of viscosity term E" obtained by the measurement plotted against temperature had an upwardly protuberant shape. In addition, as a result of the measurement, the difference between a maximum and a minimum of viscosity term E" in a temperature range of 0° C. to 80° C. was 0.15 GPa. Besides, the difference between a maximum and a minimum of the viscosity term E" in a temperature range of 40° C. to 80° C. was 0.05 GPa. In addition, the difference between a maximum and a minimum of elasticity term E' in a temperature range of 0° C. to 80° C. was 2.7 GPa.

Example 5

A magnetic tape was produced by the same method as in Example 2, except that a combination of a polyurethane resin having a glass transition temperature Tg of 60° C. and a polyurethane resin having a glass transition temperature Tg of 75° C. was used in place of the polyurethane resin (Tg: 75° C.) contained in the ground layer forming coating material.

The magnetic tape was subjected to dynamic viscoelasticity measurement in the same manner as in Example 1. A graph of viscosity term E" obtained by the measurement plotted against temperature had an upwardly protuberant shape. In addition, as a result of the measurement, the difference between a maximum and a minimum of viscosity term E" in a temperature range of 0° C. to 80° C. was 0.15 GPa. Besides, the difference between a maximum and a minimum of the viscosity term E" in a temperature range of 40° C. to 80° C. was 0.09 GPa. In addition, the difference between a maximum and a minimum of elasticity term E' in a temperature range of 0° C. to 80° C. was 2.9 GPa.

Example 6

A magnetic tape was produced in the manner as described in Example 2.

The magnetic tape was subjected to dynamic viscoelasticity measurement in the same manner as in Example 1. A graph of viscosity term E" obtained by the measurement plotted against temperature had an upwardly protuberant shape. In addition, as a result of the measurement, the difference between a maximum and a minimum of viscosity term E" in a temperature range of 0° C. to 80° C. was 0.15 GPa. Besides, the difference between a maximum and a minimum of the viscosity term E" in a temperature range of 40° C. to 80° C. was 0.07 GPa. In addition, the difference between a maximum and a minimum of elasticity term E' in a temperature range of 0° C. to 80° C. was 2.9 GPa.

Example 7

A magnetic tape was produced in the manner as described in Example 2. The magnetic tape was subjected to dynamic viscoelasticity measurement in the same manner as in Example 1. A graph of viscosity term E" obtained by the measurement plotted against temperature had an upwardly protuberant shape. In addition, as a result of the measurement, the difference between a maximum and a minimum of viscosity term E" in a temperature range of 0° C. to 80° C. was 0.15 GPa. Besides, the difference between a maximum and a minimum of the viscosity term E" in a temperature range of 40° C. to 80° C. was 0.07 GPa. In addition, the difference between a maximum and a minimum of elasticity term E' in a temperature range of 0° C. to 80° C. was 2.9 GPa.

Example 8

A magnetic tape was produced by the same method as in Example 2, except that a powder of strontium ferrite ($SrFe_{12}O_{19}$) was used in place of the powder of barium ferrite particles contained as a magnetic powder in the magnetic layer.

The magnetic tape was subjected to dynamic viscoelasticity measurement in the same manner as in Example 1. A graph of viscosity term E" obtained by the measurement plotted against temperature had an upwardly protuberant shape. In addition, as a result of the measurement, the difference between a maximum and a minimum of viscosity term E" in a temperature range of 0° C. to 80° C. was 0.15 GPa. Besides, the difference between a maximum and a minimum of the viscosity term E" in a temperature range of 40° C. to 80° C. was 0.07 GPa. In addition, the difference between a maximum and a minimum of elasticity term E' in a temperature range of 0° C. to 80° C. was 2.9 GPa.

Example 9

A magnetic tape was produced by the same method as in Example 2, except that a powder of ε-iron oxide was used in place of the powder of barium ferrite particles as the magnetic powder contained in the magnetic layer.

The magnetic tape was subjected to dynamic viscoelasticity measurement in the same manner as in Example 1. A graph of viscosity term E" obtained by the measurement plotted against temperature had an upwardly protuberant shape. In addition, as a result of the measurement, the difference between a maximum and a minimum of viscosity term E" in a temperature range of 0° C. to 80° C. was 0.15 GPa. Besides, the difference between a maximum and a minimum of the viscosity term E" in a temperature range of 40° C. to 80° C. was 0.07 GPa. In addition, the difference between a maximum and a minimum of elasticity term E' in a temperature range of 0° C. to 80° C. was 2.9 GPa.

Example 10

A magnetic tape was produced by the same method as in Example 2, except that a powder of cobalt ferrite was used in place of the powder of barium ferrite particles as the magnetic powder contained in the magnetic layer.

The magnetic tape was subjected to dynamic viscoelasticity measurement in the same manner as in Example 1. A graph of viscosity term E" obtained by the measurement plotted against temperature had an upwardly protuberant shape. In addition, as a result of the measurement, the difference between a maximum and a minimum of viscosity term E" in a temperature range of 0° C. to 80° C. was 0.15 GPa. Besides, the difference between a maximum and a minimum of the viscosity term E" in a temperature range of 40° C. to 80° C. was 0.07 GPa. In addition, the difference between a maximum and a minimum of elasticity term E' in a temperature range of 0° C. to 80° C. was 2.9 GPa.

Example 11

A magnetic tape was produced by the same method as in Example 1, except that a polyether ether ketone film (hereinafter referred to as "PEEK film"; average thickness 4.0 μm) was used in place of the PET film.

The magnetic tape was subjected to dynamic viscoelasticity measurement in the same manner as in Example 1. A graph of viscosity term E" obtained by the measurement plotted against temperature is depicted in FIG. 13. As illustrated in FIG. 13, the graph had a shape free from protuberance or recess. In addition, as a result of the measurement, the difference between a maximum and a minimum of viscosity term E" in a temperature range of 0° C. to 80° C. was 0.10 GPa. Besides, the difference between a maximum and a minimum of the viscosity term E" in a temperature range of 40° C. to 80° C. was 0.05 GPa. In addition, a graph of elasticity term E' obtained by the measurement plotted against temperature is depicted in FIG. 14. As illustrated in FIG. 14, also, as a result of the measurement, the difference between a maximum and a minimum of elasticity term E' in a temperature range of 0° C. to 80° C. was 0.3 GPa.

Example 12

A magnetic tape was produced by the same method as in Example 2, except that a polyurethane resin having a glass transition temperature Tg of 60° C. was used in place of the polyurethane resin (Tg: 75° C.) contained in the ground layer forming coating material.

The magnetic tape was subjected to dynamic viscoelasticity measurement in the same manner as in Example 1. A graph of viscosity term E" obtained by the measurement plotted against temperature had an upwardly protuberant shape. In addition, as a result of the measurement, the difference between a maximum and a minimum of viscosity term E" in a temperature range of 0° C. to 80° C. was 0.15 GPa. Besides, the difference between a maximum and a minimum of the viscosity term E" in a temperature range of 40° C. to 80° C. was 0.11 GPa. In addition, the difference between a maximum and a minimum of elasticity term E' in a temperature range of 0° C. to 80° C. was 3 GPa.

Example 13

A magnetic tape was produced in the manner as described in Example 12.

The magnetic tape was subjected to dynamic viscoelasticity measurement in the same manner as in Example 1. A graph of viscosity term E" obtained by the measurement plotted against temperature had an upwardly protuberant shape. In addition, as a result of the measurement, the difference between a maximum and a minimum of viscosity term E" in a temperature range of 0° C. to 80° C. was 0.15 GPa. Besides, the difference between a maximum and a minimum of the viscosity term E" in a temperature range of 40° C. to 80° C. was 0.11 GPa.

In addition, the difference between a maximum and a minimum of elasticity term E' in a temperature range of 0° C. to 80° C. was 3 GPa.

Example 14

A magnetic tape was produced by the same method as in Example 1, except that a polyurethane resin having a glass transition temperature Tg of 100° C. was used in place of the polyurethane resin (Tg: 75° C.) contained in the ground layer forming coating material.

The magnetic tape was subjected to dynamic viscoelasticity measurement in the same manner as in Example 1. A graph of viscosity term E" obtained by the measurement plotted against temperature had a downwardly recessed shape. In addition, as a result of the measurement, the difference between a maximum and a minimum of viscosity term E" in a temperature range of 0° C. to 80° C. was 0.10 GPa. Besides, the difference between a maximum and a minimum of the viscosity term E" in a temperature range of 40° C. to 80° C. was 0.05 GPa. In addition, the difference between a maximum and a minimum of elasticity term E' in a temperature range of 0° C. to 80° C. was 0.7 GPa.

Comparative Example 1

A magnetic tape was produced by the same method as in Example 2, except that a polyurethane resin having a glass transition temperature Tg of 30° C. was used in place of the polyurethane resin (Tg: 75° C.) contained in the ground layer forming coating material.

The magnetic tape was subjected to dynamic viscoelasticity measurement in the same manner as in Example 1. A graph of viscosity term E" obtained by the measurement plotted against temperature had an upwardly protuberant shape. In addition, as a result of the measurement, the difference between a maximum and a minimum of viscosity term E" in a temperature range of 0° C. to 80° C. was 0.19 GPa. Besides, the difference between a maximum and a minimum of the viscosity term E" in a temperature range of 40° C. to 80° C. was 0.09 GPa. In addition, the difference between a maximum and a minimum of elasticity term E' in a temperature range of 0° C. to 80° C. was 3.1 GPa.

Comparative Example 2

A magnetic tape was produced by the same method as in Example 1, except that an aramid film (average thickness 3.8 μm) was used in place of the PET film.

The magnetic tape was subjected to dynamic viscoelasticity measurement in the same manner as in Example 1. A graph of viscosity term E" obtained by the measurement plotted against temperature had a shape free from protuberance or recess. In addition, as a result of the measurement, the difference between a maximum and a minimum of viscosity term E" in a temperature range of 0° C. to 80° C. was 0.22 GPa. Besides, the difference between a maximum and a minimum of the viscosity term E" in a temperature range of 40° C. to 80° C. was 0.07 GPa. In addition, the temperature at which the maximum of the viscosity term E" was measured was more than 80° C. Besides, a graph of elasticity term E' obtained by the measurement plotted against temperature is depicted in FIG. 14. As illustrated in FIG. 14, also, as a result of the measurement, the difference between a maximum and a minimum of elasticity term E' in a temperature range of 0° C. to 80° C. was 2.7 GPa.

(2) Evaluation (Evaluation of Influence of Long-Term Preservation on Reproduction)

The magnetic tapes of Examples 1 to 14 and Comparative Examples 1 and 2 were each wound around a reel provided in a cartridge case, so that a magnetic recording cartridge was obtained. Servo signals were recorded on the whole length of the magnetic tape, and information was recorded. The servo signals included a row of magnetic patterns in the shape of inverted v. The recording track width of each magnetic recording cartridge is set forth in Table 1.

Next, each of the magnetic recording cartridges produced in Examples 1 to 14 and Comparative Examples 1 and 2 was subjected to whole length reproduction by a magnetic recording and reproduction apparatus. The reproduction track width of a reproducing head used in the whole length reproduction of each magnetic recording cartridge is set forth in Table 1. In addition, the ratio of ((reproduction track width)/(recording track width)) of each magnetic recording cartridge is also set forth in the Table.

Thereafter, each magnetic recording cartridge was preserved for two weeks at a temperature of 40° C. and a relative humidity of 80%. The preservation corresponds to preservation at 25° C. for a period on the order of 100 days. After the preservation, each magnetic recording cartridge was subjected to whole length reproduction in the same manner as above-mentioned.

Based on the difference in the time required for the whole length reproduction between before the preservation and after the preservation, the magnetic tape of each magnetic recording cartridge was evaluated according to the following criterion. Evaluation results are set forth in Table 1.

<Evaluation Criterion>

1: A fail (stop of reproduction due to an error) is generated during whole length reproduction, making whole length reproduction impossible.
2: A retry is frequently generated during whole length reproduction, and the time required for whole length reproduction after the preservation is equal to or more than 1.2 times that before the preservation.

3: A retry is generated during whole length reproduction, and the time required for whole length reproduction after the preservations is equal to or more than 1.1 times and less than 1.2 times that before the preservation.
4: A retry is generated during whole length reproduction, and the time required for whole length reproduction after the preservation is equal to or more than 1.02 times and less than 1.1 times that before the preservation.
5: A retry is not generated during whole length reproduction, or, although a retry is generated during whole length reproduction, the time required for whole length reproduction after the preservation is less than 1.02 times that before the preservation.

(Evaluation of SNR)

Further, for the magnetic tapes of Examples 1 to 14 and Comparative Examples 1 and 2, SNR was evaluated. Evaluation results are set forth in Table 1. The evaluating method for SNR was as follows.

First, using a ½ inch tape traveling apparatus (MTS Transport, produced by Mountain Engineering II, Inc.) mounted with a recording/reproducing head and a recording/reproducing amplifier, SNR (electromagnetic conversion characteristics) of the magnetic tapes in a 25° C. environment was measured. A ring head with a gap length of 0.2 μm was used as a recording head, and a GMR head with a shield interval of 0.1 μm was used as a reproducing head. A relative velocity of 6 m/s, a recording clock frequency of 160 MHz, and a recording track width of 2.0 μm were adopted. In addition, the SNR was calculated based on the method described in the following literature. In regard of SNR, the value in Example 1 was used as a reference, and a relative evaluation of whether the SNR value was raised or lowered relative to the reference was performed.

Y. Okazaki: "An Error Rate Emulation System.", IEEE Trans. Man., 31, pp. 3093-3095 (1995)

TABLE 1

| | DIFFERENCE BETWEEN MAXIMUM AND MINIMUM OF VISCOSITY TERM E" IN 0° C.-80° C. | DIFFERENCE BETWEEN MAXIMUM AND MINIMUM OF VISCOSITY TERM E" IN 40° C.-80° C. | DIFFERENCE BETWEEN MAXIMUM AND MINIMUM OF ELASTICITY TERM E' IN 0° C.-80° C. | RECESS OR PROTUBERANCE OF GRAPH | (REPRODUCTION TRACK WIDTH)/ (RECORDING TRACK WIDTH) | RECORDING TRACK WIDTH | REPRODUCTION TRACK WIDTH |
|---|---|---|---|---|---|---|---|
| Example 1 | 0.10 | 0.07 | 0.9 | RECESS | 0.65 | 1.56 | 1.01 |
| Example 2 | 0.15 | 0.07 | 2.9 | PROTUBERANCE | 0.65 | 1.56 | 1.01 |
| Example 3 | 0.17 | 0.07 | 2.9 | PROTUBERANCE | 0.65 | 1.56 | 1.01 |
| Example 4 | 0.15 | 0.05 | 2.7 | PROTUBERANCE | 0.65 | 1.56 | 1.01 |
| Example 5 | 0.15 | 0.09 | 2.9 | PROTUBERANCE | 0.65 | 1.56 | 1.01 |
| Example 6 | 0.15 | 0.07 | 2.9 | PROTUBERANCE | 0.77 | 0.87 | 0.67 |
| Example 7 | 0.15 | 0.07 | 2.9 | PROTUBERANCE | 0.70 | 1.56 | 1.09 |
| Example 8 | 0.15 | 0.07 | 2.9 | PROTUBERANCE | 0.65 | 1.56 | 1.01 |
| Example 9 | 0.15 | 0.07 | 2.9 | PROTUBERANCE | 0.65 | 1.56 | 1.01 |
| Example 10 | 0.15 | 0.07 | 2.9 | PROTUBERANCE | 0.65 | 1.56 | 1.01 |
| Example 11 | 0.10 | 0.05 | 0.3 | ABSENT | 0.65 | 1.56 | 1.01 |
| Example 12 | 0.15 | 0.11 | 3 | PROTUBERANCE | 0.65 | 1.56 | 1.01 |
| Example 13 | 0.15 | 0.11 | 3 | PROTUBERANCE | 0.83 | 1.17 | 0.97 |
| Example 14 | 0.10 | 0.05 | 0.7 | RECESS | 0.65 | 1.56 | 1.01 |
| Comparative Example 1 | 0.19 | 0.09 | 3.1 | PROTUBERANCE | 0.65 | 1.56 | 1.01 |
| Comparative Example 2 | 0.22 | 0.07 | 2.7 | ABSENT | 0.65 | 1.56 | 1.01 |

| | PERPENDICULAR ORIENTATION | OVERALL TAPE THICKNESS (μm) | BASE LAYER THICKNESS (μm) | KIND OF BASE LAYER | MAGNETIC POWDER | EVALUATION RESULT OF WHOLE LENGTH REPRODUCTION AFTER LONG-TERM PRESERVATION | SNR (dB) |
|---|---|---|---|---|---|---|---|
| Example 1 | PRESENT | 5.2 | 4.0 | PET | $BaFe_{12}O_{19}$ | 5 | 0.0 |
| Example 2 | PRESENT | 5.2 | 4.0 | PEN | $BaFe_{12}O_{19}$ | 4 | 0.0 |
| Example 3 | PRESENT | 5.2 | 4.2 | PEN | $BaFe_{12}O_{19}$ | 4 | 0.0 |
| Example 4 | PRESENT | 5.2 | 4.0 | PEN | $BaFe_{12}O_{19}$ | 4 | 0.0 |
| Example 5 | PRESENT | 5.2 | 4.0 | PEN | $BaFe_{12}O_{19}$ | 4 | 0.0 |
| Example 6 | PRESENT | 5.2 | 4.0 | PEN | $BaFe_{12}O_{19}$ | 3 | −1.5 |
| Example 7 | PRESENT | 5.2 | 4.0 | PEN | $BaFe_{12}O_{19}$ | 4 | 0.3 |

TABLE 1-continued

| | | | | | | | |
|---|---|---|---|---|---|---|---|
| Example 8 | PRESENT | 5.2 | 4.0 | PEN | $SrFe_{12}O_{19}$ | 4 | 0.0 |
| Example 9 | PRESENT | 5.2 | 4.0 | PEN | ε-IRON OXIDE | 4 | 0.0 |
| Example 10 | PRESENT | 5.2 | 4.0 | PEN | COBALT FERRITE | 4 | 0.0 |
| Example 11 | PRESENT | 5.2 | 4.0 | PEEK | $BaFe_{12}O_{19}$ | 5 | 0.0 |
| Example 12 | PRESENT | 5.2 | 4.0 | PEN | $BaFe_{12}O_{19}$ | 3 | 0.0 |
| Example 13 | PRESENT | 5.2 | 4.0 | PEN | $BaFe_{12}O_{19}$ | 3 | −0.1 |
| Example 14 | PRESENT | 5.2 | 4.0 | PET | $BaFe_{12}O_{19}$ | 5 | 0.0 |
| Comparative Example 1 | PRESENT | 5.2 | 4.0 | PEN | $BaFe_{12}O_{19}$ | 1 | 0.0 |
| Comparative Example 2 | PRESENT | 5.2 | 4.0 | ARAMID | $BaFe_{12}O_{19}$ | 2 | 0.0 |

From the results set forth in Table 1, the followings are seen.

The magnetic tapes of Examples 1 to 14 all have an evaluation result of influence of long-term preservation on reproduction of 3 to 5. In other words, with the magnetic tapes of Examples 1 to 14, the time required for whole length reproduction might be increased due to long-term preservation, but whole length reproduction was possible. On the other hand, with the magnetic tape of Comparative Example 1, whole length reproduction was impossible, and with the magnetic tape of Comparative Example 2, a retry was frequently generated.

In addition, from a comparison of, for example, Examples 2 and 3 with Comparative Example 1, it is seen that with the difference between a maximum and a minimum of viscosity term E" in a temperature range of 0° C. to 80° C. in the case where dynamic viscoelasticity measurement was conducted being, for example, equal to or less than 0.18 GPa, particularly being equal to or less than 0.17 GPa, the influence of long-term preservation on reproduction can be reduced.

Besides, the results of Examples 1 and 11 and Comparative Example 2, also, indicate that with the difference between a maximum and a minimum of viscosity term E" in a temperature range of 0° C. to 80° C. in the case where the dynamic viscoelasticity measurement was conducted being, for example, equal to or less than 0.18 GPa, particularly being equal to or less than 0.17 GPa, the influence of long-term preservation on reproduction can be reduced. In addition, these results indicate that, even in the case where the kind of the resin forming the base layer is different, the influence of long-term preservation on reproduction can be reduced, with the difference being, for example, equal to or less than 0.18 GPa, particularly being equal to or less than 0.17 GPa.

From a comparison of Example 2 with Examples 8 to 10, it is seen that, even when the kind of the magnetic powder is changed, the effect of the present technology is produced.

From a comparison of Example 12 with Examples 2, 4, and 5, it is seen that with the difference between a maximum and a minimum of viscosity term E" in a temperature range of 40° C. to 80° C. in the case where the dynamic viscoelasticity measurement was conducted being, for example, equal to or less than 0.10 GPa, particularly being equal to or less than 0.09 GPa, the influence of long-term preservation on reproduction can be further reduced.

Upon comparison of Examples 2, 6, and 13, Example 2 was better than Examples 6 and 13 in evaluation result of whole length reproduction after long-term preservation and in SNR. Therefore, it is seen that by setting the ratio of ((reproduction track width)/(recording track width)) to be, for example, equal to or less than 0.75, preferably equal to or less than 0.72, and more preferably equal to or less than 0.70, it is possible to reduce the influence of long-term preservation and further to improve SNR.

The results of Examples 1 and 11 were better than the other Examples in the whole length reproduction evaluation result after long-term preservation. Therefore, it is seen that with a graph of the viscosity term E" obtained by the dynamic viscoelasticity measurement plotted against temperature having a downwardly recessed shape or having a shape free from recess or protuberance, and with the difference between a maximum and a minimum of the viscosity term E" in a temperature range of 0° C. to 80° C. in the case where the dynamic viscoelasticity measurement was conducted being, for example, equal to or less than 0.12 GPa, the influence of long-term preservation can be further reduced.

From a comparison of Examples 1, 11, and 14 with the other Examples, it is seen that with the difference between a maximum and a minimum of elasticity term E' in a temperature range of 0° C. to 80° C. being preferably equal to or less than 1.5 GPa, more preferably equal to or less than 0.9 GPa, and further preferably equal to or less than 0.5 GPa, the influence of long-term preservation on reproduction can be further reduced.

While Embodiments and Examples of the present technology have been specifically described above, the present technology is not limited to above-described Embodiments and Examples, and various modifications are possible based on the technical thought of the present technology.

For example, the configurations, methods, steps, shapes, materials, numerical values, and the like mentioned in the aforementioned Embodiments and Examples are merely examples, and configurations, methods, steps, shapes, materials, numerical values, and the like different from these may be used, as required. In addition, the chemical formulas of compounds and the like are typical ones, and the general names of the same compound are not limited by the described valence or the like.

Besides, the configurations, methods, steps, shapes, materials, numerical values, and the like in the aforementioned Embodiments and Examples can be combined with one another, so long as the combination does not depart from the gist of the present technology.

In addition, the numerical value ranges represented by use of "to" herein indicate the ranges including the numerical values described before and after "to" as a minimum and a maximum. In the numerical value ranges described stepwise herein, the upper limit value or lower limit value in the numerical value range at a step may be replaced by the upper limit value or lower limit value in the numerical value range at other step. The materials mentioned as examples herein can be used either singly or in combination of two or more of them, unless otherwise specified.

Note that the present technology can take the following configurations. [1] A magnetic recording medium in a tape shape including:
a magnetic layer;
a ground layer;
a base layer; and
a back layer,
in which an average thickness $t_T$ of the magnetic recording medium is equal to or less than 5.3 μm, and
when the magnetic recording medium is subjected to dynamic viscoelasticity measurement at a frequency of 10 Hz and a temperature rise rate of 2° C./min, a difference between a maximum and a minimum of a viscosity term E" in a temperature range of 0° C. to 80° C. is equal to or less than 0.18 GPa.

[2] The magnetic recording medium according to [1], in which, when the magnetic recording medium is subjected to the dynamic viscoelasticity measurement, a difference between a maximum and a minimum of the viscosity term E" in a temperature range of 40° C. to 80° C. is equal to or less than 0.10 GPa.

[3] The magnetic recording medium according to [1] or [2], in which, when the magnetic recording medium is subjected to the dynamic viscoelasticity measurement, a temperature at which a maximum of the viscosity term E" of the magnetic recording medium in −10° C. to 140° C. is measured is in a range of 0° C. to 80° C.

[4] The magnetic recording medium according to any one of [1] to [3], in which, when the magnetic recording medium is subjected to the dynamic viscoelasticity measurement,
the viscosity term E" of the magnetic recording medium exhibits a tendency of variation in which
the viscosity term E" of the magnetic recording medium increases as a measurement temperature rises from 0° C.,
the viscosity term E" of the magnetic recording medium reaches a maximum when the measurement temperature is in a range of more than 0° C. and less than 80° C., and
the viscosity term E" of the magnetic recording medium decreases as the measurement temperature rises from a temperature at which the maximum is measured to 80° C.

[5] The magnetic recording medium according to any one of [1] to [4], in which, when the magnetic recording medium is subjected to the dynamic viscoelasticity measurement, a difference between a maximum and a minimum of the viscosity term E" in a temperature range of 0° C. to 80° C. is 0.13 to 0.17 GPa.

[6] The magnetic recording medium according to [1] or [2], in which, when the magnetic recording medium is subjected to the dynamic viscoelasticity measurement, a temperature at which a minimum of the viscosity term E" of the magnetic recording medium in −10° C. to 140° C. is measured is in a range of 0° C. to 80° C.

[7] The magnetic recording medium according to [1], [2], or [6], in which, when the magnetic recording medium is subjected to the dynamic viscoelasticity measurement,
the viscosity term E" of the magnetic recording medium exhibits a tendency of variation in which
the viscosity term E" of the magnetic recording medium decreases as a measurement temperature rises from 0° C.,
the viscosity term E" of the magnetic recording medium reaches a minimum when the measurement temperature is in a range of more than 0° C. and less than 80° C., and
the viscosity term E" of the magnetic recording medium increases as the measurement temperature rises from a temperature at which the minimum is measured to 80° C.

[8] The magnetic recording medium according to [1], [2], [6], or [7], in which, when the magnetic recording medium is subjected to the dynamic viscoelasticity measurement, a difference between a maximum and a minimum of the viscosity term E" in a temperature range of 0° C. to 80° C. is equal to or less than 0.12 GPa.

[9] The magnetic recording medium according to [1] or [2],
in which, when the magnetic recording medium is subjected to the dynamic viscoelasticity measurement,
a difference between a maximum and a minimum of the viscosity term E" in a temperature range of 0° C. to 80° C. is equal to or less than 0.12 GPa, and
a difference between a maximum and a minimum of the viscosity term E" in a temperature range of 40° C. to 80° C. is equal to or less than 0.06 GPa.

[10] The magnetic recording medium according to [1], [2], [6], [7], [8], or [9], in which, when the magnetic recording medium is subjected to the dynamic viscoelasticity measurement, a difference between a maximum and a minimum of an elasticity term E' in a temperature range of 0° C. to 80° C. is equal to or less than 1.5 GPa.

[11] The magnetic recording medium according to [1], [2], [8], or [9], in which, when the magnetic recording medium is subjected to the dynamic viscoelasticity measurement, a difference between a maximum and a minimum of an elasticity term E' in a temperature range of 0° C. to 80° C. is equal to or less than 0.5 GPa.

[12] The magnetic recording medium according to any one of [1] to [11], in which the base layer includes any one of PET, PEN, or PEEK.

[13] The magnetic recording medium according to any one of [1] to [12], in which a thickness of the base layer is equal to or less than 4.2 μm.

[14] The magnetic recording medium according to any one of [1] to [12], in which a thickness of the base layer is equal to or less than 4.0 μm.

[15] The magnetic recording medium according to any one of [1] to [14], in which a length of the magnetic recording medium in a longitudinal direction is equal to or more than 1,000 m.

[16] The magnetic recording medium according to any one of [1] to [15], in which a squareness ratio in a perpendicular direction is equal to or less than 65%.

[17] The magnetic recording medium according to any one of [1] to [16], in which an average thickness $t_m$ of the magnetic layer is equal to or less than 80 nm.

[18] The magnetic recording medium according to any one of [1] to [16], in which an average thickness $t_m$ of the magnetic layer is equal to or less than 50 nm.

[19] The magnetic recording medium according to any one of [1] to [18], in which the magnetic layer includes a magnetic powder, and the magnetic powder contains hexagonal ferrite, ε iron oxide, or Co-containing spinel ferrite.

[20] The magnetic recording medium according to [19], in which the hexagonal ferrite contains at least one of Ba or Sr, and the ε iron oxide contains at least one of Al or Ga.

[21] The magnetic recording medium according to any one of [1] to [20], in which a coercive force $H_c$ in a longitudinal direction is equal to or less than 2,000 Oe.

[22] The magnetic recording medium according to any one of [1] to [21], in which the magnetic layer is configured to be able to record data such that a minimum of a magnetization reversal interval L is equal to or less than 48 nm.

[23] The magnetic recording medium according to any one of [1] to [22], in which the magnetic layer includes a magnetic powder, and an average aspect ratio of the magnetic powder is from 1.0 to 3.5.

[24] The magnetic recording medium according to any one of [1] to [23], in which the magnetic layer includes a magnetic powder, and an average particle size of the magnetic powder is equal to or less than 50 nm.

[25] The magnetic recording medium according to any one of [1] to [24], in which the magnetic layer includes a magnetic powder, and an average particle volume of the magnetic powder is equal to or less than 1,500 nm$^3$.

[26] The magnetic recording medium according to any one of [1] to [25], in which the magnetic layer includes a magnetic powder, and an average particle size of the magnetic powder is equal to or less than 1,300 nm$^3$.

[27] The magnetic recording medium according to any one of [1] to [26], in which the average thickness $t_T$ of the magnetic recording medium is equal to or less than 5.2 μm.

[28] A tape cartridge including:
the magnetic recording medium according to any one of [1] to [27].

[29] The tape cartridge according to [28], including:
a communication section that performs communication with a recording and reproduction apparatus;
a storage section; and
a control section that stores information received from the recording and reproduction apparatus through the communication section into the storage section and, in response to a request from the recording and reproduction apparatus, reads out information from the storage section to transmit the information to the recording and reproduction apparatus through the communication section,
in which the information includes adjustment information for adjusting a tension exerted on the magnetic recording medium in a longitudinal direction.

REFERENCE SIGN LIST

10: Magnetic recording medium
11: Base layer
12: Ground layer
13: Magnetic layer
14: Back layer

The invention claimed is:

1. A magnetic recording medium in a tape shape comprising:
a magnetic layer;
a ground layer;
a base layer including at least one of polyethylene terephthalate (PET), polyethylene naphthalate (PEN), or polyether ether ketone (PEEK); and
a back layer,
wherein an average thickness $t_T$ of the magnetic recording medium is equal to or less than 5.3 μm, and
when the magnetic recording medium is subjected to dynamic viscoelasticity measurement at a frequency of 10 Hz and a temperature rise rate of 2° C./min, a difference between a maximum and a minimum of a viscosity term E" in a temperature range of 0° C. to 80° C. is from 0.10 to 0.17 GPa.

2. The magnetic recording medium according to claim 1, wherein, when the magnetic recording medium is subjected to the dynamic viscoelasticity measurement, a difference between a maximum and a minimum of the viscosity term E" in a temperature range of 40° C. to 80° C. is equal to or less than 0.10 GPa.

3. The magnetic recording medium according to claim 1, wherein, when the magnetic recording medium is subjected to the dynamic viscoelasticity measurement, a temperature at which a maximum of the viscosity term E" of the magnetic recording medium in −10° C. to 140° C. is measured is in a range of 0° C. to 80° C.

4. The magnetic recording medium according to claim 1, wherein, when the magnetic recording medium is subjected to the dynamic viscoelasticity measurement,
the viscosity term E" of the magnetic recording medium exhibits a tendency of variation in which
the viscosity term E" of the magnetic recording medium increases as a measurement temperature rises from 0° C.,
the viscosity term E" of the magnetic recording medium reaches a maximum when the measurement temperature is in a range of more than 0° C. and less than 80° C., and
the viscosity term E" of the magnetic recording medium decreases as the measurement temperature rises from a temperature at which the maximum is measured to 80° C.

5. The magnetic recording medium according to claim 1, wherein, when the magnetic recording medium is subjected to the dynamic viscoelasticity measurement, a difference between a maximum and a minimum of the viscosity term E" in a temperature range of 0° C. to 80° C. is 0.13 to 0.17 GPa.

6. The magnetic recording medium according to claim 1, wherein, when the magnetic recording medium is subjected to the dynamic viscoelasticity measurement, a temperature at which a minimum of the viscosity term E" of the magnetic recording medium in −10° C. to 140° C. is measured is in a range of 0° C. to 80° C.

7. The magnetic recording medium according to claim 1, wherein, when the magnetic recording medium is subjected to the dynamic viscoelasticity measurement,
the viscosity term E" of the magnetic recording medium exhibits a tendency of variation in which
the viscosity term E" of the magnetic recording medium decreases as a measurement temperature rises from 0° C.,
the viscosity term E" of the magnetic recording medium reaches a minimum when the measurement temperature is in a range of more than 0° C. and less than 80° C., and
the viscosity term E" of the magnetic recording medium increases as the measurement temperature rises from a temperature at which the minimum is measured to 80° C.

8. The magnetic recording medium according to claim 1, wherein, when the magnetic recording medium is subjected to the dynamic viscoelasticity measurement, a difference between a maximum and a minimum of the viscosity term E" in a temperature range of 0° C. to 80° C. is equal to or less than 0.12 GPa.

9. The magnetic recording medium according to claim 1, wherein, when the magnetic recording medium is subjected to the dynamic viscoelasticity measurement,
a difference between a maximum and a minimum of the viscosity term E" in a temperature range of 0° C. to 80° C. is equal to or less than 0.12 GPa, and a difference between a maximum and a minimum of the viscosity term E" in a temperature range of 40° C. to 80° C. is equal to or less than 0.06 GPa.

10. The magnetic recording medium according to claim 1, wherein, when the magnetic recording medium is subjected to the dynamic viscoelasticity measurement, a difference between a maximum and a minimum of an elasticity term E' in a temperature range of 0° C. to 80° C. is equal to or less than 1.5 GPa.

11. The magnetic recording medium according to claim 1, wherein, when the magnetic recording medium is subjected to the dynamic viscoelasticity measurement, a difference between a maximum and a minimum of an elasticity term E' in a temperature range of 0° C. to 80° C. is equal to or less than 0.5 GPa.

12. The magnetic recording medium according to claim 1, wherein a thickness of the base layer is equal to or less than 4.2 μm.

13. The magnetic recording medium according to claim 1, wherein a thickness of the base layer is equal to or less than 4.0 μm.

14. The magnetic recording medium according to claim 1, wherein a length of the magnetic recording medium in a longitudinal direction is equal to or more than 1,000 m.

15. The magnetic recording medium according to claim 1, wherein a squareness ratio in a perpendicular direction is equal to or less than 65%.

16. The magnetic recording medium according to claim 1, wherein an average thickness $t_m$ of the magnetic layer is equal to or less than 80 nm.

17. The magnetic recording medium according to claim 1, wherein an average thickness $t_m$ of the magnetic layer is equal to or less than 50 nm.

18. The magnetic recording medium according to claim 1, wherein the magnetic layer includes a magnetic powder, and the magnetic powder contains hexagonal ferrite, ε iron oxide, or Co-containing spinel ferrite.

19. The magnetic recording medium according to claim 14, wherein the hexagonal ferrite contains at least one of Ba or Sr, and the ε iron oxide contains at least one of Al or Ga.

20. The magnetic recording medium according to claim 1, wherein a coercive force $H_c$ in a longitudinal direction is equal to or less than 2,000 Oe.

21. The magnetic recording medium according to claim 1, wherein the magnetic layer is configured to be able to record data such that a minimum of a magnetization reversal interval L is equal to or less than 48 nm.

22. The magnetic recording medium according to claim 1, wherein the magnetic layer includes a magnetic powder, and an average aspect ratio of the magnetic powder is from 1.0 to 3.5.

23. The magnetic recording medium according to claim 1, wherein the magnetic layer includes a magnetic powder, and an average particle size of the magnetic powder is equal to or less than 50 nm.

24. The magnetic recording medium according to claim 1, wherein the magnetic layer includes a magnetic powder, and an average particle volume of the magnetic powder is equal to or less than 1,500 $nm^3$.

25. The magnetic recording medium according to claim 1, wherein the magnetic layer includes a magnetic powder, and an average particle volume of the magnetic powder is equal to or less than 1,300 $nm^3$.

26. The magnetic recording medium according to claim 1, wherein the average thickness $t_T$ of the magnetic recording medium is equal to or less than 5.2 μm.

27. A tape cartridge comprising:
the magnetic recording medium according to claim 1.

28. The tape cartridge according to claim 27, comprising:
a communication section that performs communication with a recording and reproduction apparatus;
a storage section; and
a control section that stores information received from the recording and reproduction apparatus through the communication section into the storage section and, in response to a request from the recording and reproduction apparatus, reads out information from the storage section to transmit the information to the recording and reproduction apparatus through the communication section,
wherein the information includes adjustment information for adjusting a tension exerted on the magnetic recording medium in a longitudinal direction.

* * * * *